(12) United States Patent
Chiba

(10) Patent No.: US 11,257,288 B2
(45) Date of Patent: Feb. 22, 2022

(54) FEATURE HEIGHT-BASED COLORED IMAGE GENERATING APPARATUS AND FEATURE HEIGHT-BASED COLORED IMAGE GENERATING PROGRAM

(71) Applicant: ASIA AIR SURVEY CO., LTD., Tokyo (JP)

(72) Inventor: Tatsuro Chiba, Tokyo (JP)

(73) Assignee: ASIA AIR SURVEY CO., LTD., Tokyo (JP)

( * ) Notice: Subject to any disclaimer, the term of this patent is extended or adjusted under 35 U.S.C. 154(b) by 0 days.

(21) Appl. No.: 16/770,384

(22) PCT Filed: Dec. 5, 2018

(86) PCT No.: PCT/JP2018/044738
§ 371 (c)(1),
(2) Date: Jun. 5, 2020

(87) PCT Pub. No.: WO2019/111955
PCT Pub. Date: Jun. 13, 2019

(65) Prior Publication Data
US 2021/0166475 A1    Jun. 3, 2021

(30) Foreign Application Priority Data
Dec. 8, 2017 (JP) .............................. JP2017-236026

(51) Int. Cl.
*G06T 17/05* (2011.01)
*G01C 7/04* (2006.01)
(Continued)

(52) U.S. Cl.
CPC ............... *G06T 17/05* (2013.01); *G01C 7/04* (2013.01); *G06T 17/20* (2013.01); *G06T 15/04* (2013.01)

(58) Field of Classification Search
CPC ......... G06T 17/05; G06T 17/20; G06T 15/04; G01C 7/04
See application file for complete search history.

(56) References Cited

U.S. PATENT DOCUMENTS

| 7,133,551 | B2 * | 11/2006 | Chen | ...................... G06F 30/13 |
| | | | | 382/154 |
| 7,764,282 | B2 | 7/2010 | Chiba | |

(Continued)

FOREIGN PATENT DOCUMENTS

| JP | 3670274 | 4/2005 |
| JP | 2011-48495 | 3/2011 |

(Continued)

OTHER PUBLICATIONS

Tatsuro Chiba, "Distributed products and displayed printed matter", Techno Forum, Asia Air Survey Co., Ltd, 2017, with English translation.

(Continued)

*Primary Examiner* — Said Broome
(74) *Attorney, Agent, or Firm* — Greenblum & Bernstein, P.L.C

(57) ABSTRACT

Provided are a first DSM generating unit, a ground DEM storing unit, a first DEM generating unit, a 2 m ground DEM storing unit, a first DHM generating unit, a first inclination image generating unit, a first inclination image storing unit, a first red relief image generating unit, a first gradient-tinted image generating unit, a first feature height-based colored image generating unit, a first building height comparison image generating unit, and the like. Accordingly, an image does not look dirty, and an image in which a shape of a feature is outlined clearly is obtained.

8 Claims, 23 Drawing Sheets
(10 of 23 Drawing Sheet(s) Filed in Color)

(51) Int. Cl.
*G06T 17/20* (2006.01)
*G06T 15/04* (2011.01)

(56) References Cited

U.S. PATENT DOCUMENTS

| | | | |
|---|---|---|---|
| 7,876,319 B2 | 1/2011 | Chiba | |
| 9,367,743 B1* | 6/2016 | Haglund | G06K 9/0063 |
| 9,701,408 B1 | 7/2017 | Willison | |
| 2003/0014224 A1* | 1/2003 | Guo | G06T 17/10 |
| | | | 703/1 |
| 2007/0002040 A1* | 1/2007 | Oldroyd | G01C 11/00 |
| | | | 345/419 |
| 2011/0144962 A1* | 6/2011 | Blask | G06T 17/05 |
| | | | 703/6 |
| 2011/0308204 A1* | 12/2011 | Corradi | B65B 57/14 |
| | | | 53/472 |

FOREIGN PATENT DOCUMENTS

| | | |
|---|---|---|
| JP | 4771459 | 7/2011 |
| JP | 2013-54499 | 3/2013 |
| JP | 2013-054660 | 3/2013 |

OTHER PUBLICATIONS

Official Communication issued in International Bureau of WIPO Patent Application No. PCT/JP2018/044738, dated Feb. 12, 2019.
Written Opinion issued in International Patent Application No. PCT/JP2018/044738, dated Feb. 12, 2019.
Inomata, T. et al., "Archaeological application of airborne LiDAR with object-based vegetation classification and visualization techniques at the lowland Maya site of Ceibal, Guatemala", Remote Sensing, vol. 9(6), published Jun. 5, 2017.
Zielke, O. et al., "Fault slip and earthquake recurrence along strike-slip faults—Contributions of high-resolution geomorphic data", Tectonophysics, published 2014.
Official Action dated Mar. 18, 2021 issued in Australian application No. 2018381377.
Chiba, et al. "Red relief image map: new visualization method for three dimensional data." The international archives of the photogrammetry, and spatial information sciences 37. B2 (2008).

* cited by examiner

DSM RED RELIEF IMAGE GQ (GQ') EMPHASIZED 0.2 TIMES

DSM INCLINATION IMAGE GS (GS')

FOREST

FIG. 8

| | | |
|---:|:---:|:---|
| GREEN | | −5 METERS |
| WHITE | | 0 METERS |
| LIGHT BLUE | | 1.8 METERS |
| GRAY | | 8 METERS |
| YELLOW | | 18 METERS |
| VERMILLION | | 30 METERS |
| REDDISH VERMILLION | | 50METERS |
| RED-EMPHASIZED PURPLE | | 64 METERS |
| PURPLE | | 128 METERS |
| BLUE | | 256 METERS |

DHM HEIGHT GRADIENT-TINTED IMAGE GD (GD')

BUILDING HEIGHT COMPARISON IMAGE GM (GM')
NO RED
(FIG. 6 + FIG. 9)   LOWER PART OF ROAD (GRAY)
PURPLE                        VERMILLION

YELLOW

COOLMAP RESOLUTION: 1 FEET MESH

FIG. 16

DEM DATA

| MESH NUMBER mi | X COORDINATE (LONGITUDE: Xi) | X COORDINATE (LATITUDE: Yi) | Z COORDINATE (GROUND ELEVATION VALUE: Zgi) |
|---|---|---|---|
| 1 | X1 | Y1 | Zg1 |
| 2 | X2 | Y2 | Zg2 |
| ⋮ | ⋮ | ⋮ | ⋮ |
| n | Xn | Yn | Zgn |

FIG. 19

ABOVEGROUND OPENING AND UNDERGROUND OPENING AT FOCUSED SAMPLE POINT (BLACK CIRCLE MARK) IN PRINCIPAL TERRAIN OPENINGS ARE ILLUSTRATED BY OCTAGONAL GRAPHS IN WHICH ABOVEGROUND ANGLES AND UNDERGROUND ANGLES (90 DEGREES) ON FLAT TERRAIN ARE USED AS RELATIVE SCALES WITH 5 SCALE MARKS IN RESPECTIVE DIRECTIONS

| | BASIC TERRAIN | ABOVEGROUND OPENING | UNDERGROUND OPENING |
|---|---|---|---|
| 1 | FLAT TERRAIN | (MEDIUM) | (MEDIUM) |
| 2 | CREST | (VERY LARGE) | (VERY SMALL) |
| 3 | CONCAVE TERRAIN | (VERY SMALL) | (VERY LARGE) |
| 4 | RIDGE EXTENDING NORTH TO SOUTH | (LARGE) | (SMALL) |

FIG. 21
(a)
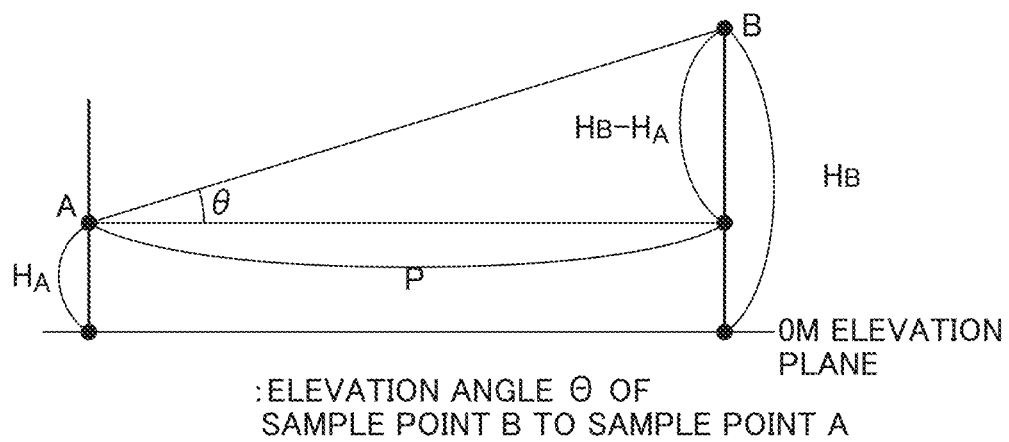
: ELEVATION ANGLE θ OF
SAMPLE POINT B TO SAMPLE POINT A
(b)
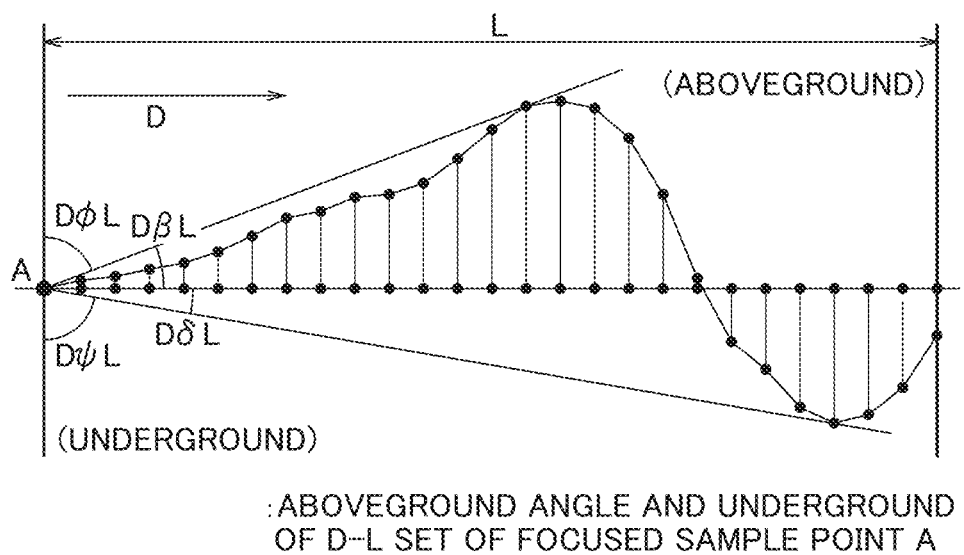
: ABOVEGROUND ANGLE AND UNDERGROUND ANGLE
OF D-L SET OF FOCUSED SAMPLE POINT A

FIG. 23

RED RELIEF IMAGE KGi

| GRID NUMBER i | X COORDINATE (LONGITUDE : Xi) | Y COORDINATE (LATITUDE : Yi) | Z COORDINATE (GROUND ELEVATION VALUE: Zgi) |
|---|---|---|---|
| K₁  1 | X1 | Y1 | Zg1 |
| K₂  2 | X2 | Y2 | Zg2 |
| . | . | . | . |
| . | . | . | . |
| n | Xn | Yn | Zgn |

| ABOVE-GROUND OPENING | COLOR VALUE | ELEVATION-DEPRESSION DEGREE $\Psi M$ | COLOR VALUE | INCLINATION DEGREE Gm | COLOR VALUE | UNDER-GROUND OPENING $\Psi N$ | COLOR VALUE |
|---|---|---|---|---|---|---|---|
| θ1 | ××× | $\Psi m1$ | △△△ | Gm1 | ○○○ | $\Psi m$ | △○△ |
| | | $\Psi m2$ | | | | | |
| | | | | | | | |
| | | | | | | | |
| | | | | | | | |
| | | | | | | | |

FEATURE HEIGHT-BASED COLORED IMAGE GENERATING APPARATUS AND FEATURE HEIGHT-BASED COLORED IMAGE GENERATING PROGRAM

TECHNICAL FIELD

The present invention relates to a feature height-based colored image generating apparatus.

BACKGROUND ART

Patent Literature 1 provides a visualization processing system in which concavity and convexity of a terrain is visualized three-dimensionally by color combination. This visualization processing system maps a vector field in a three-dimensional coordinate space, obtains a corresponding sequence of coordinate points, and determines a first elevation degree in a local region of a plane connecting the sequence of coordinate points.

The system then determines a second depression degree in the local region of the plane connecting the sequence of coordinate points and synthesizes the second elevation degree and the first depression degree in a weighting manner to determine an elevation-depression degree in the local region of the plane connecting the sequence of coordinate points.

The system then maps the coordinate space on a two-dimensional plane and provides a tone indication commensurate with the elevation-depression degree to a region on the two-dimensional plane corresponding to the local region of the plane connecting the sequence of coordinate points. At this time, the indication is provided in red color in accordance with the elevation-depression degree. This image is referred to as a red relief map image.

On the other hand, a color elevation and inclination map generating system in Patent Literature 2 generates a color elevation map expressed by gradation colors in which a color is allocated to each elevation value based on DEM data stored in a data storing means so that the color may gradually change in accordance with the elevation value. The system also generates a grayscale inclination map in which an inclination value is calculated based on the DEM data, and in which density is allocated to the inclination value, so that the inclination value may be expressed by a grayscale.

The system then synthesizes the generated color elevation map with the generated grayscale inclination map to generate a color elevation and inclination map. Also, the system synthesizes the color elevation map with the grayscale inclination map by making the opacity of the color elevation map different from the opacity of the grayscale inclination map and making the value for the opacity of the grayscale inclination map lower than the value for the opacity of the color elevation map.

CITATION LIST

Patent Literature

Patent Literature 1: Japanese granted patent publication No. 3670274

Patent Literature 2: Japanese granted patent publication No. 4771459

SUMMARY OF INVENTION

Technical Problem

However, the visualization processing system in Patent Literature 1 provides the tone indication commensurate with the elevation-depression degree to the region on the two-dimensional plane corresponding to the local region of the plane connecting the sequence of coordinate points to generate the red relief map. The red color is provided to emphasize the height.

For this reason, for example, in a case in which a high building exists in a city area, a shadow thereof is emphasized, which causes the edge of the building to be displayed in black. Also, roads are shadowed. As a result, the image looks dirty.

On the other hand, since the color elevation and inclination map generating system in Patent Literature 2 colors the elevation of the ground and expresses the inclination by means of the grayscale, a height of a building cannot be expressed in color.

The present invention is has been made to solve the foregoing problems, and an object of the present invention is to provide a feature height-based colored image generating apparatus in which a height of a feature in a city area is displayed in color in accordance with the height, and in which an image does not look dirty.

Solution to Problem

A feature height-based colored image generating apparatus according to the present invention includes:

a digital elevation model storing means storing a digital elevation model (DEM) of an area;

a digital surface model storing means storing a digital surface model (DSM) of the area;

a DHM generating means generating a DHM, which is a difference between the digital elevation model (DEM) and the digital surface model (DSM), in a DHM storing unit;

a means deriving an inclination per mesh of the DHM and generating an inclination image in which a grayscale value corresponding to the inclination is allocated to the mesh;

a means decreasing an elevation value allocated to each mesh of the digital surface model (DSM) certain times per mesh, setting each mesh as a focused point, defining a certain range per focused point, and deriving an aboveground opening, an underground opening, and an inclination, to generate in a red relief image storing means a red relief image in which a brighter color is allocated to a part having a higher aboveground opening, in which a darker color is allocated to a part having a higher underground opening, and in which a red-emphasized color is allocated to a part having a higher inclination;

a means reading per mesh of the DHM a height of a feature allocated to the mesh and generating in a relative height gradient-tinted image storing means a relative height gradient-tinted image in which a color value is allocated to the mesh in accordance with the height of the feature;

a means generating in a feature height comparison image storing means a feature height comparison image in which the inclination image and the relative height gradient-tinted image are overlaid on each other; and a means generating in a feature height-based colored image storing means a feature height-based colored image in which the red relief image and the feature height comparison image are overlaid on each other.

Advantageous Effects of Invention

As described above, according to the present invention, since a width of a shadow is short even when a feature is high, an image does not look dirty, and a shape of the feature is outlined clearly.

Also, since a height of the feature is displayed in color, it is possible to visually recognize how high the feature is according to the color kind straightforwardly. Also, a height of a ground can be recognized in color.

BRIEF DESCRIPTION OF DRAWINGS

The patent or application file contains at least one drawing executed in color. Copies of this patent or patent application publication with color drawing(s) will be provided by the Office upon request and payment of the necessary fee.

FIG. 8 illustrates CRT.

FIG. 16 illustrates DEM data.

FIG. 19 illustrates major patterns of the aboveground opening and the underground opening.

FIG. 21 illustrates sample points and a length of the aboveground opening and the underground opening.

FIG. 23 illustrates a data structure of a red relief image KGi.

DESCRIPTION OF EMBODIMENTS

In description of embodiments, an embodiment in which data captured with use of an oblique camera is used will be described as Embodiment 1, and an embodiment in which laser data is used will be described as Embodiment 2. Also, in description of Embodiment 1 and Embodiment 2, units and pieces of information having similar functions are provided with "first" and "second," respectively.

Embodiment 1

Figure 1:
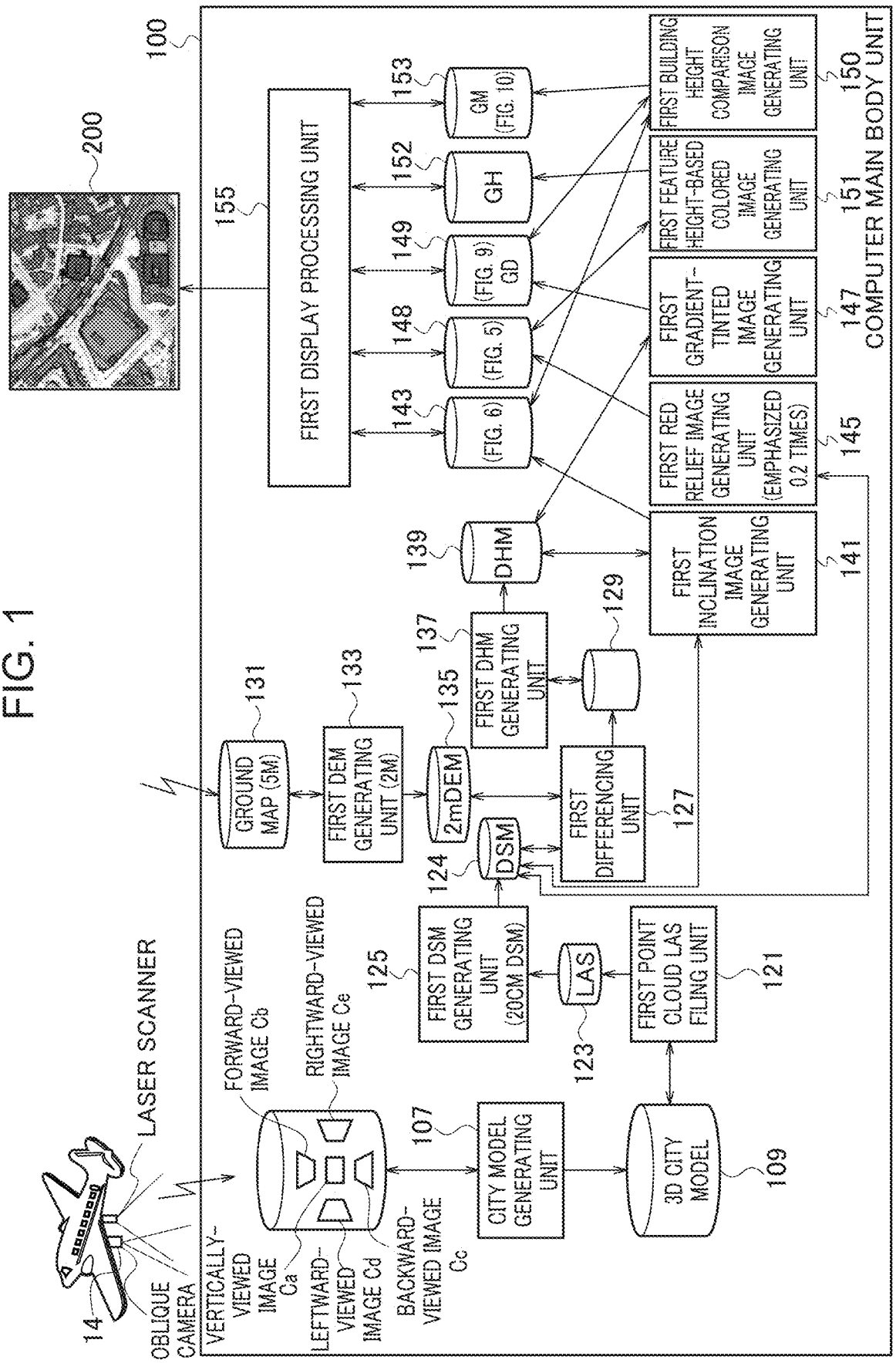
FIG. 1 is a configuration diagram illustrating an overview of a feature height-based colored image generating apparatus according to Embodiment 1.

FIG. 1 is a configuration diagram illustrating an overview of a feature height-based colored image generating apparatus according to Embodiment 1. In description of Embodiment 1, features include buildings, trees, roads, and the like in a city.

As illustrated in FIG. 1, the feature height-based colored image generating apparatus according to Embodiment 1 includes a first computer main body unit 100, a first display unit 200, and the like.

The first computer main body unit 100 includes the following units (means).

The first computer main body unit 100 includes an oblique camera image storing unit 102, a 3D city model generating unit 107, a 3D city model storing unit 109, a first point cloud LAS filing unit 121, a first LAS data storing unit 123, a first DSM generating unit 125 (for example, 20 cm DEM), a first DSM data storing unit 124, a first differencing unit 127, a first differencing data storing unit 129, a ground DEM storing unit 131 having stored therein a 5 m mesh ground DEM (Geospatial Information Authority of Japan), a first DEM generating unit 133 (for example, 2 m mesh), a 2 m ground DEM storing unit 135 storing a 2 m ground DEM, a first DHM generating unit 137, a first inclination image generating unit 141, a first inclination image storing unit 143, a first red relief image generating unit 145 (for example, height emphasized 0.2 times), a first gradient-tinted image generating unit 147, a first feature height-based colored image generating unit 151, a first building height comparison image generating unit 150, and the like.

Meanwhile, the DEM (Digital Elevation Model) is referred to as a digital elevation model, and the DSM (Digital Surface Model) is referred to as a digital surface model. Also, the DHM (Digital Height Model) is obtained by modeling a height of a feature itself.

The first computer main body unit 100 further includes a first inclination image storing unit 143, a first red relief image storing unit 148, a first gradient-tinted image storing unit 149, a first feature height-based color display image storing unit 152, a first building height comparison image storing unit 153, a first display processing unit 155, and the like.

The oblique camera image storing unit 102 has stored therein an oblique camera image Ci of an aboveground city area captured by an oblique camera 12 installed on an aircraft 10 or the like.

For example, a capturing location and a posture (exterior orientation) are estimated and derived, with use of a parallax thereof, three-dimensional coordinates (relative orientation) of each pixel are derived by a calculating formula of trigonometry, denoising is performed, and color information for a corresponding point is applied to a mesh of a stereoscopic model based on the three-dimensional coordinates, to generate a 3D model.

The oblique camera image Ci includes a vertically-viewed image Ca, a forward-viewed image Cb, a backward-viewed image Cc, a leftward-viewed image Cd, and a rightward-viewed image Ce. That is, images of a feature in a city are captured in a plurality of directions at the same time.

Also, the oblique camera image Ci is associated with a number of the oblique camera 12, a camera kind, image resolution, a CCD element size, a focal length, capturing time, a posture Op at the time of capturing, an altitude, and the like.

The aforementioned aircraft 10 preferably flies in a city area at an altitude of 1000 m several to several tens of times to capture laser data Ri and the oblique camera image Ci.

The 3D city model generating unit 107 generates a three-dimensional image (texture) with use of the oblique camera image Ci (such as Ca, Cb, Cc, Cd, and Ce). The three-dimensional image is stored as a 3D city model image Mi in the 3D city model storing unit 109. The three-dimensional coordinates are allocated to each pixel of the 3D city model image Mi.

The first point cloud LAS filing unit 121 converts the 3D city model image Mi in the 3D city model storing unit 109 into a LAS file and stores the LAS file in the first LAS data storing unit 123.

The first DSM generating unit 125 generates a 20 cm DSM in the first DSM data storing unit 124 based on the LAS data in the first LAS data storing unit 123.

The first DEM generating unit 133 (for example, 2 m mesh) reads from the ground DEM storing unit 131 the 5 m mesh ground DEM (hereinbelow referred to as a 5 m ground DEM or a first ground DEM) in a city area stored in the ground DEM storing unit 131, changes the 5 m ground DEM into a 2 m DEM, and generates the 2 m DEM in the 2 m ground DEM storing unit 135.

The first differencing unit 127 stores a difference between the 20 cm DSM in the first DSM data storing unit 124 and the 2 m ground DEM (also referred to as a second 2 m ground DEM) in the ground DEM storing unit 131 as differencing image data (DHM=DSM−DEM) in the first differencing data storing unit 129. The differencing image data (DHM=DSM−DEM) will specifically be described in a flowchart.

The first DHM generating unit 137 generates a DHM based on the differencing image data in the first differencing data storing unit 129 and stores the DHM in a first DHM data storing unit 139.

The first inclination image generating unit 141 derives an inclination per mesh of the 20 cm DSM in the first DSM data storing unit 124 and generates a first inclination image GS based on the inclination in the first inclination image storing unit 143.

The first red relief image generating unit 145 (for example, height emphasized 0.2 times) reads a height (Z value, which is also referred to as an elevation value) per mesh of the 20 cm DSM in the first DSM data storing unit 124. The first red relief image generating unit 145 then generates data obtained by emphasizing the height 0.2 times, for example, in the first red relief image storing unit 148. The first red relief image generating unit 145 then generates a read relief image (hereinbelow referred to as a first red relief image GQ (emphasized 0.2 times)) from the data obtained by emphasizing the height 0.2 times.

That is, the elevation value allocated to each mesh of the digital surface model (DSM) is decreased certain times per mesh, each mesh is set as a focused point, a certain range is defined per focused point, and respective averages of an aboveground opening, an underground opening, and an inclination in plural directions in the certain range are derived, to generate a red relief image in which a brighter color is allocated to a part having a higher aboveground opening, in which a darker color is allocated to a part having a higher underground opening, and in which a red-emphasized color is allocated to a part having a higher inclination.

The first gradient-tinted image generating unit 147 uses the DHM in the first DHM data storing unit 139 to generate a first gradient-tinted image GD in the first gradient-tinted image storing unit 149.

The first feature height-based colored image generating unit 151 overlays a first building height comparison image GM in the first building height comparison image storing unit 153 on the first red relief image GQ (emphasized 0.2 times) in the first red relief image storing unit 148 to generate a first feature height-based colored image GH in the first feature height-based color display image storing unit 152.

The first display processing unit 155 displays on the first display unit 100 the DHM in the first DHM data storing unit 139, the first inclination image GS in the first inclination image storing unit 143, the first red relief image GQ (emphasized 0.2 times) in the first red relief image storing unit 148, or the first gradient-tinted image GD in the first gradient-tinted image storing unit 149.

Figure 2:
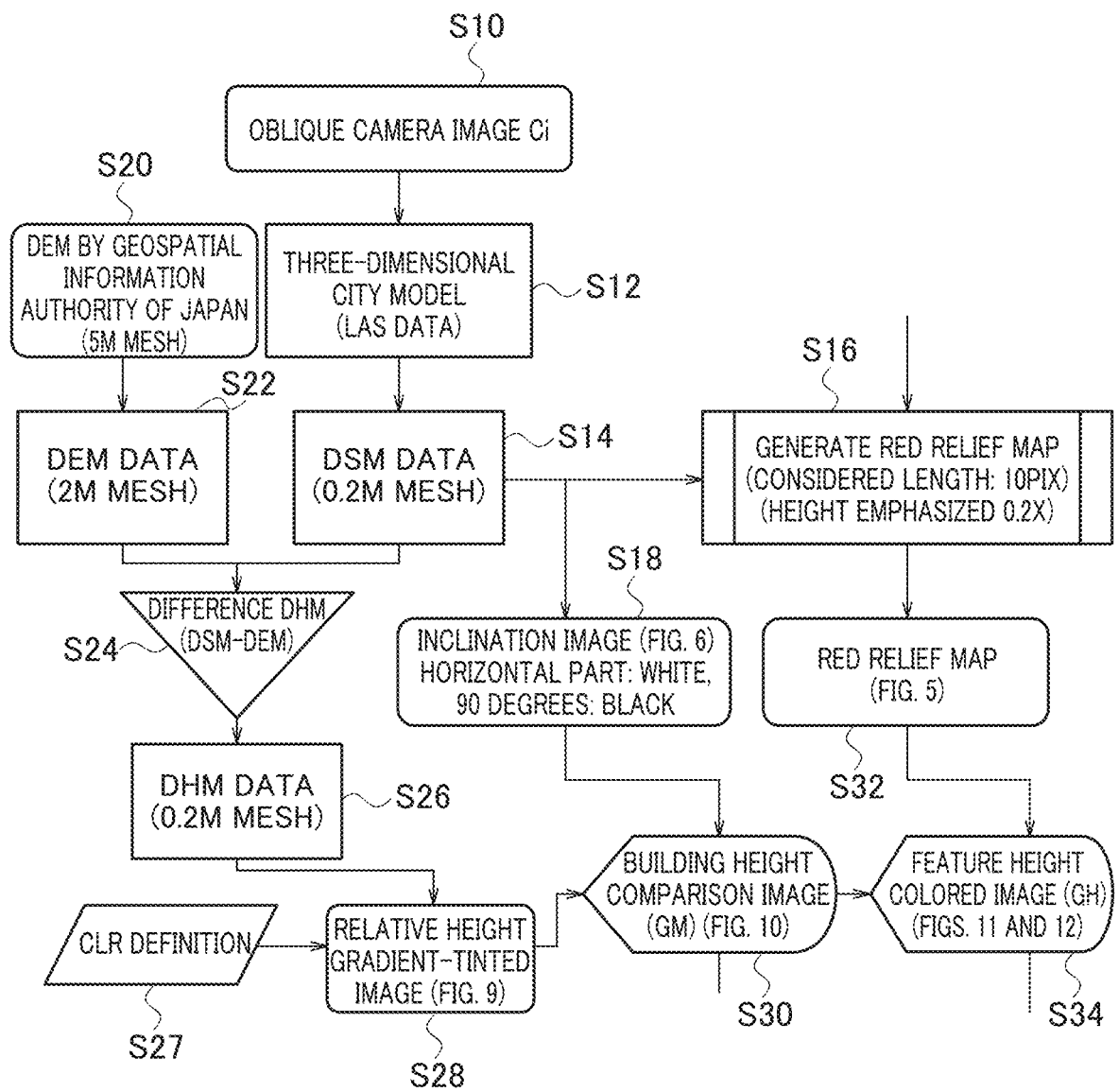
FIG. 2 is a flowchart of processing of the feature height-based colored image generating apparatus according to Embodiment 1.

Processing of the feature height-based colored image generating apparatus according to Embodiment 1 configured as above will be described below with use of the flowchart in FIG. 2. FIG. 2 illustrates processing in a case in which an oblique camera image is used.

As illustrated in FIG. 2, the 3D city model generating unit 107 reads an oblique camera image Ci (such as Ca. Cb, Cc, Cd, and Ce) in the oblique camera image storing unit 102 (S10).

Subsequently, the 3D city model generating unit 107 generates the 3D city model image Mi in the 3D city model storing unit 109 with use of the oblique camera image Ci (such as Ca, Cb, Cc, Cd, and Ce). Also, the first point cloud LAS filing unit 121 converts the 3D city model image Mi in the 3D city model storing unit 109 into a LAS file and generates the LAS file in the first LAS data storing unit 123 (S12).

The first DSM generating unit 125 then generates a 20 cm DSM in the first DSM data storing unit 124 based on the LAS data in the first LAS data storing unit 123.

On the other hand, the first red relief image generating unit 145 (for example, height emphasized 0.2 times) reads a height per mesh of the 20 cm DSM in the first DSM data storing unit 124. The first red relief image generating unit 145 then generates a first red relief image GQ (emphasized 0.2 times) obtained by emphasizing the height 0.2 times, for example, in the first red relief image storing unit 148.

Figure 3:
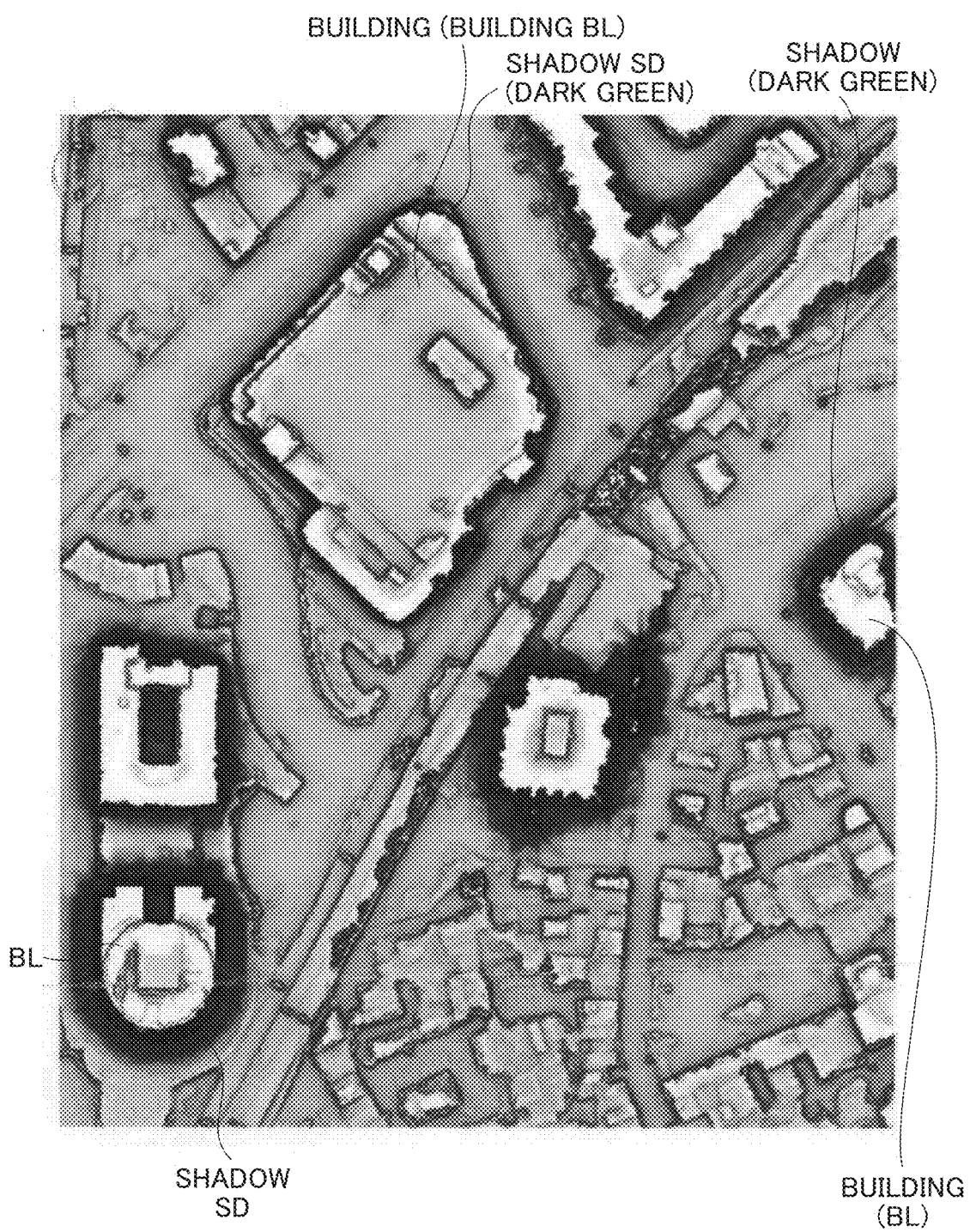
FIG. 3 illustrates a shadow of a building as a result of red relief image generating processing.

In the red relief image generating processing, as illustrated in FIG. 3, the higher a building (for example, a BL) is, the wider a shadow thereof around the building becomes, which causes the image to look blackish. In FIG. 3, a shadow SD is shown in dark green. Thus, the height of the building (for example, the BL) is emphasized 0.2 times as illustrated in FIG. 4.

Figure 4:
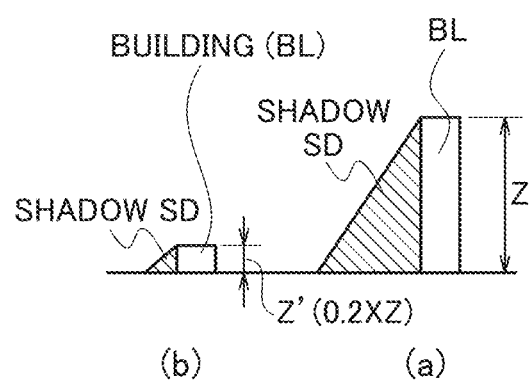
FIG. 4 illustrates an effect of a 0.2-time emphasis.

Consequently, the high building BL illustrated in FIG. 4 (*a*) looks lower in height as illustrated in FIG. 4 (*b*), and the shadow SD looks narrower. Also, since the red relief image generating processing is performed, the edge of the building BL is slightly emphasized.

In generating the first red relief image GQ (emphasized 0.2 times), a length L defining a certain range from a focused point is set to be as long as 10 pixels (about 1 m). Generation of a red relief map will be described below. The length L changes depending on the height of the building.

Figure 5:
FIG. 5 illustrates a first red relief image GQ (emphasized 0.2 times).

The first red relief image GQ (emphasized 0.2 times) is illustrated in FIG. 5. As illustrated in FIG. 5, the entire image is reddish, the edge of each building is emphasized, and the higher building is displayed to be more whitish. The red relief image is referred to as a red relief map as well since coordinates are allocated to the mesh.

The first inclination image generating unit 141 derives an inclination per mesh of the 20 cm DSM in the first DSM data storing unit 124 and generates a first inclination image GS based on the inclination in the first inclination image storing unit 143 (S18).

Figure 6:
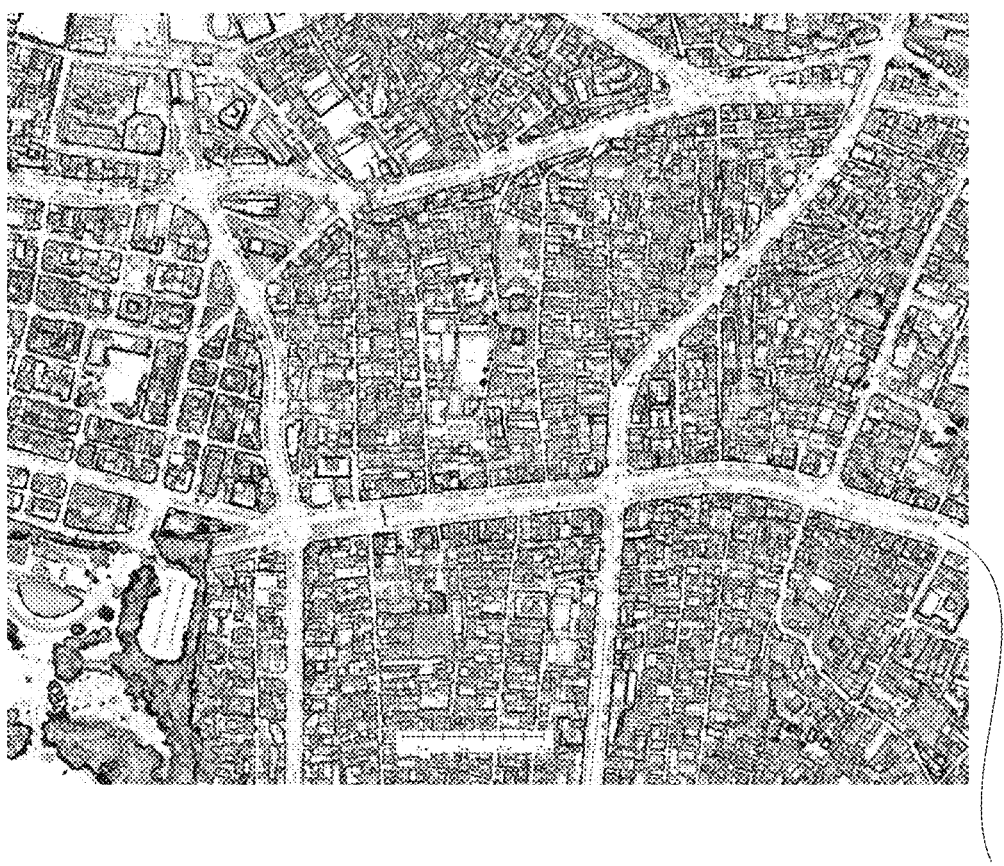
FIG. 6 illustrates an inclination image GS.

The inclination image GS is illustrated in FIG. 6. The inclination image GS illustrated in FIG. 6 is a monochrome image. A horizontal part (inclination: 0 degrees) is displayed in white, and a part having an inclination of the vicinity of 0 degrees (excluding 0 degrees) to 99 degrees is displayed in black. As illustrated in FIG. 6, the shapes of the buildings and roads can be recognized.

On the other hand, the first DEM generating unit 133 (for example, 2 m DEM) reads from the ground DEM storing unit 131 the 5 m ground DEM in a city area stored in the ground DEM storing unit 131 (S20).

The first DEM generating unit 133 then changes the 5 m ground DEM into a 2 m mesh DEM and generates the 2 m DEM in the first DEM storing unit 135 (for example, 2 m mesh) (S22).

The first differencing unit 127 derives a difference between the 20 cm DSM in the first DSM data storing unit 124 and the 2 m ground DEM in the ground DEM storing unit 131 as differencing image data (DHM=DSM-DEM) (S24). Specifically, in each mesh of the 2 m ground DEM, coordinates (x, y, and z) corresponding to the 20 cm DEM are derived, and a difference from the derived coordinates (x, y, and z) is derived as the differencing image data (DHM=DSM-DEM).

Meanwhile, instead of the 20 cm DEM, a 50 cm, 10 cm, or 5 cm DEM may be employed. The result is stored in the first differencing data storing unit 129.

Figure 7:
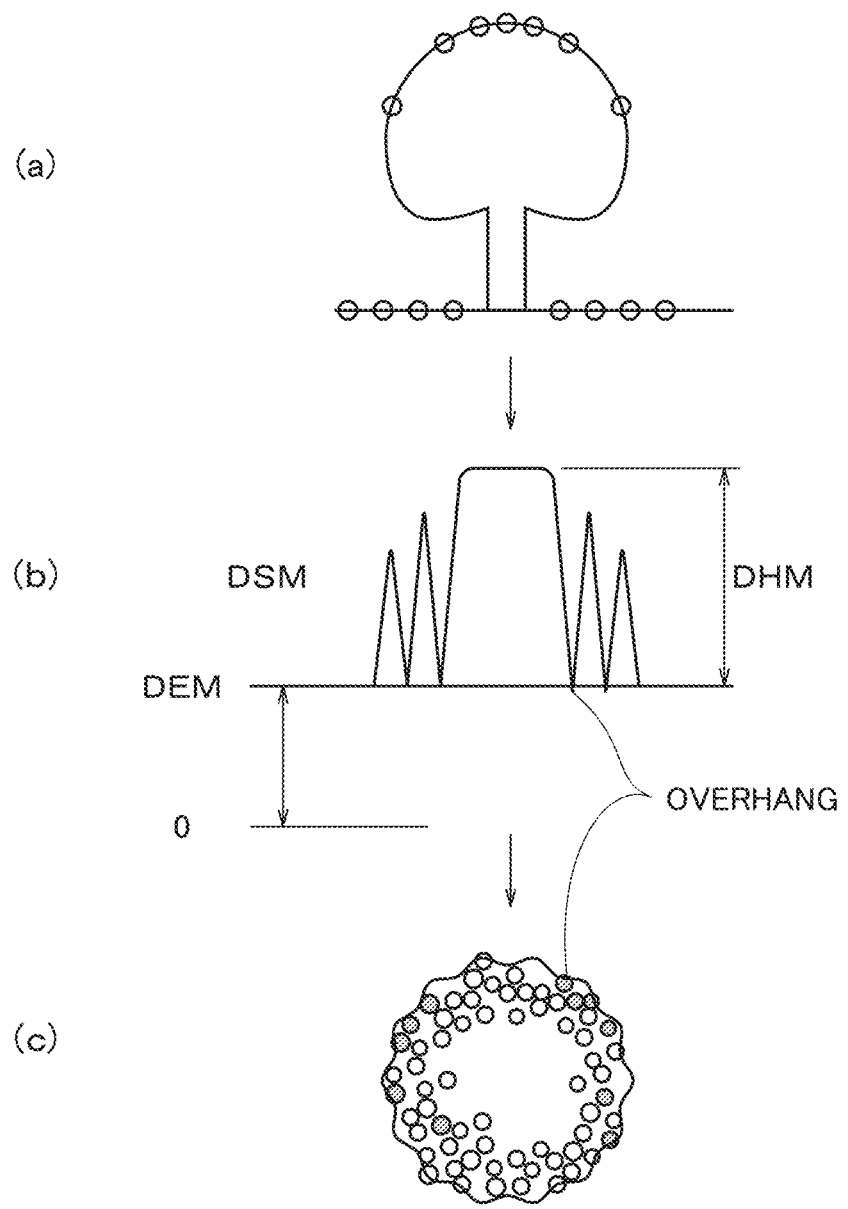
FIG. 7 illustrates an overhang.

FIG. 7 (a) illustrates the DSM. A tree is shown in FIG. 7 (a). FIG. 7 (b) illustrates a cross-section of the DHM. As illustrated in FIG. 7 (c), an overhang is displayed in black.

The first DHM generating unit 137 generates a DHM based on the differencing image data in the first differencing data storing unit 129 in the first DHM data storing unit 139 (S24). That is, as illustrated in FIG. 7 (b), the height of the tree is obtained.

The first gradient-tinted image generating unit 147 inputs CRT definition (color value in accordance with the height) and generates in the first gradient-tinted image storing unit 149 a first gradient-tinted image GD (also referred to as a relative height gradient-tinted image) of the DHM in the first DHM data storing unit 139 (S28). The CRT is illustrated in FIG. 8.

Figure 9:
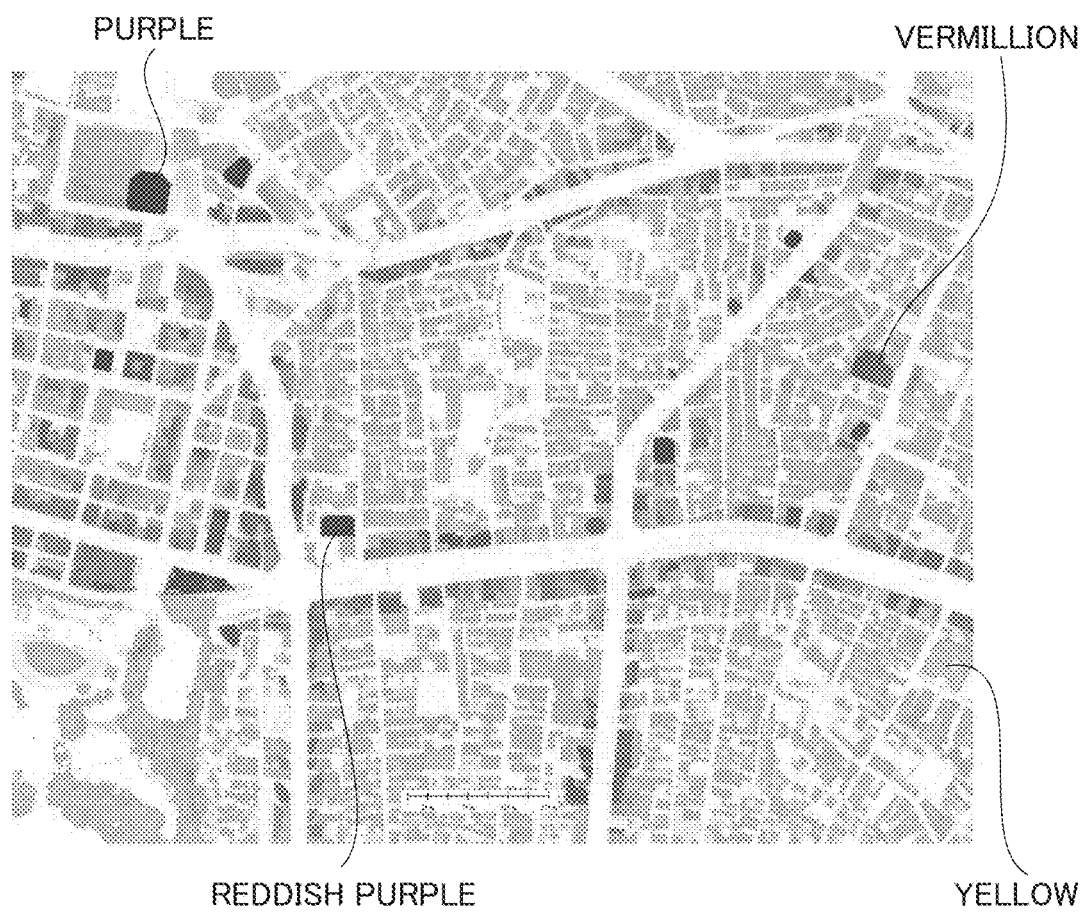
FIG. 9 illustrates a gradient-tinted image GD.

That is, as illustrated in FIG. 9, in the first gradient-tinted image GD (also referred to as a relative height gradient-tinted image), the highest building BL is displayed in purple, the building lower than the purple building BL is displayed in reddish purple, the building BL lower than the reddish purple building is displayed in vermillion, and the building lower than the vermillion building is displayed in yellow. Hence, the first gradient-tinted image GD can be used as a height comparison view.

The first building height comparison image generating unit 150 overlays the inclination image GS (refer to FIG. 6) in the first inclination image storing unit 143 on the gradient-tinted image GD (refer to FIG. 9) in the first gradient-tinted image storing unit 149 to generate a first building height comparison image GM in the first building height compari-son image storing unit 153 (S30). The first gradient-tinted image GD is also referred to as a first DIM height gradient-tinted image.

Figure 10:
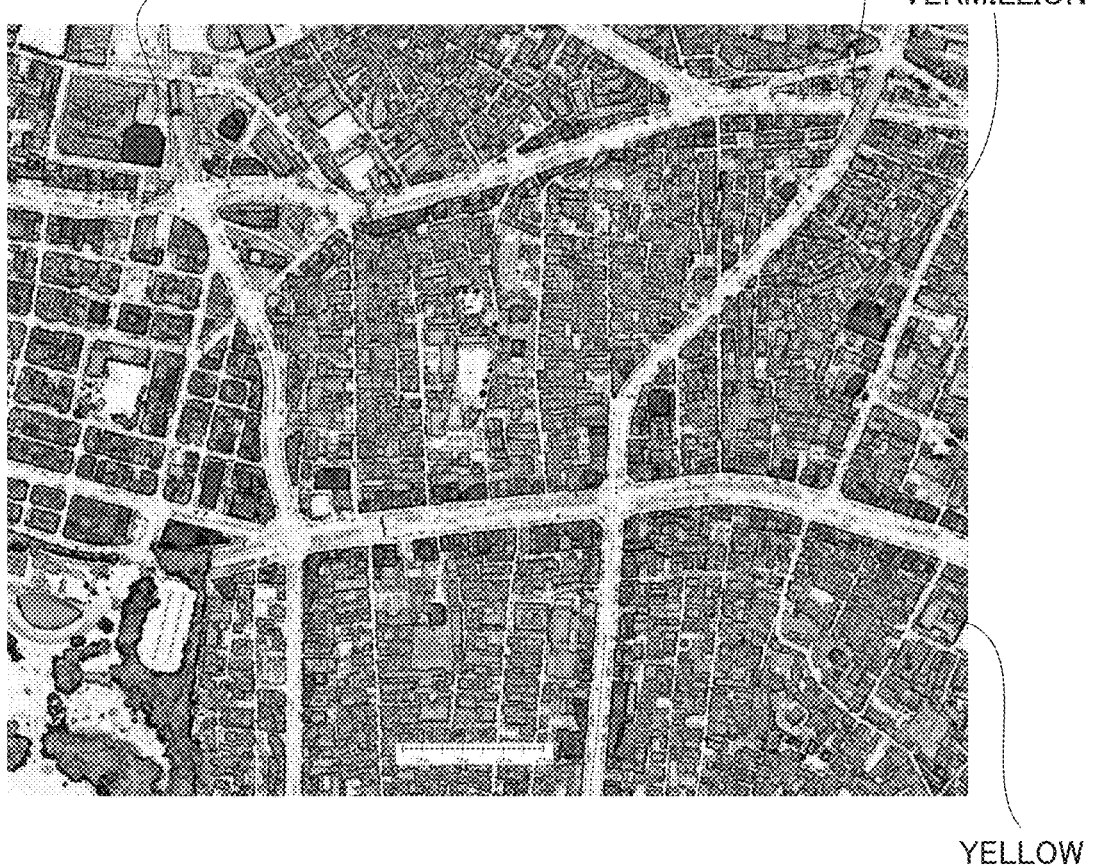
FIG. 10 illustrates a building height comparison image GM.

FIG. 10 illustrates the building height comparison image GM. As illustrated in FIG. 10, a lower part of a road (downward slope) is displayed in gray, the highest building BL is displayed in purple, the second highest building is displayed in vermillion, and the third highest building is displayed in yellow. Accordingly, the shape of the building, the height of the building, and the inclination (height) of the road can be recognized by color.

Subsequently, the first feature height-based colored image generating unit 151 overlays the first building height comparison image GM (refer to FIG. 10) in the first building height comparison image storing unit 153 on the first red relief image GQ (emphasized 0.2 times, refer to FIG. 5) in the first red relief image storing unit 148 to generate a first feature height-based colored image GH in the first feature height-based color display image storing unit 152.

Figure 11:
FIG. 11 illustrates a feature height-based colored image GH (1/2).
Figure 12:
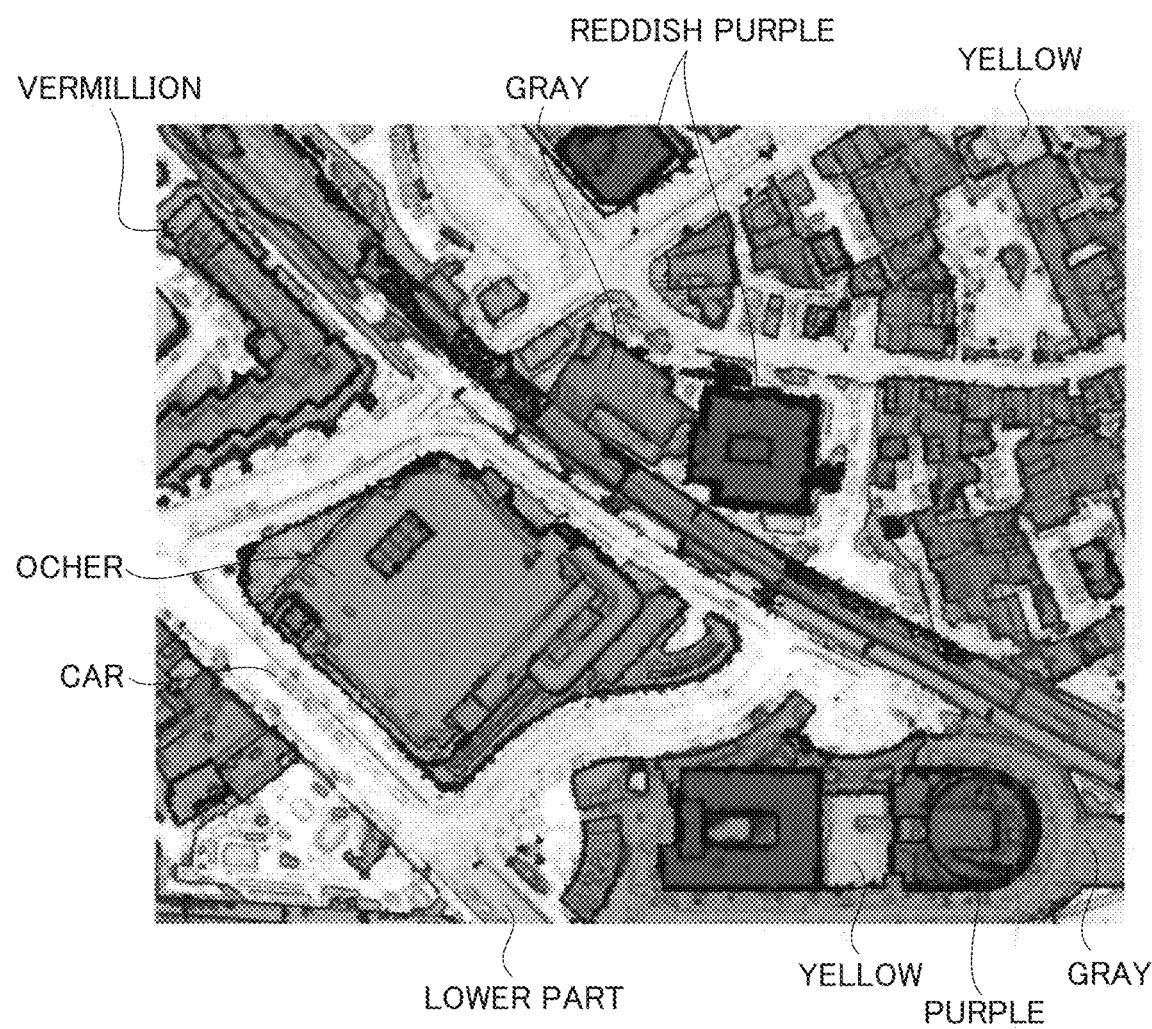
FIG. 12 illustrates the feature height-based colored image GH (2/2).

The first feature height-based colored image GH is illustrated in FIGS. 11 and 12. As illustrated in FIG. 11, in the first feature height-based colored image GH (also referred to as Cool Map), the highest building is displayed in purple, the second highest building is displayed in vermillion, and the third highest building is displayed in yellow-green, and the downward slope of the road is displayed in gray. Also, the entire image is slightly reddish. That is, variations of the buildings, roads, and terrains can be recognized by color. Also, as illustrated in FIG. 12, cars are displayed by color. Further, persons can be displayed by color.

In other words, the city map is differentiated, is provided with a variety of colors, is slightly reddish, and reduces the sizes of the shadows.

Also, since the heights of the features are automatically expressed by color, an operator does not need to input elevations.

Embodiment 2

Figure 13:
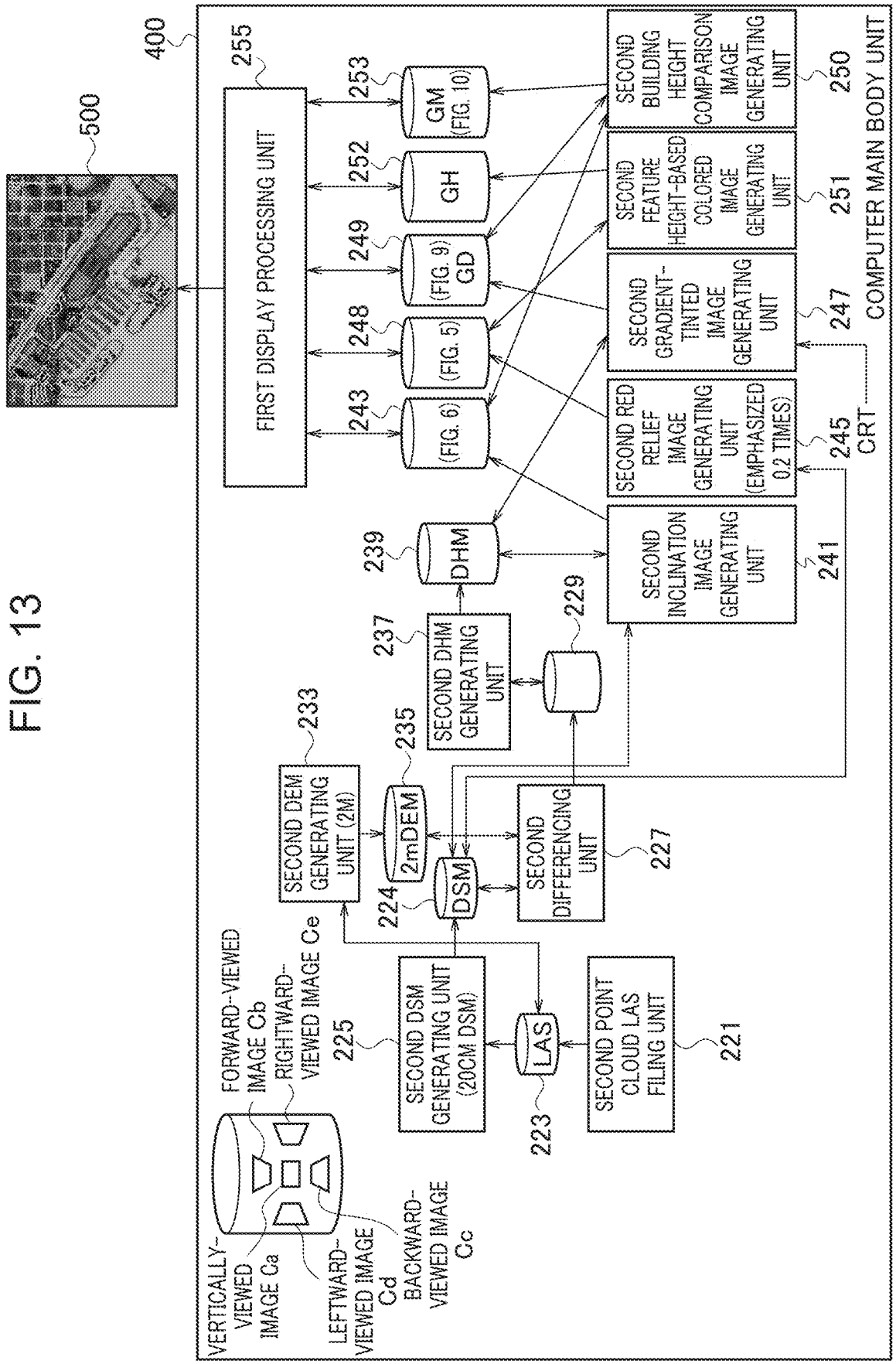
FIG. 13 is a schematic configuration diagram of a feature height-based colored image generating apparatus according to Embodiment 2.

FIG. 13 is a schematic configuration diagram of a feature height-based colored image generating apparatus according to Embodiment 2. The feature height-based colored image generating apparatus according to Embodiment 2 uses laser data Ri.

As illustrated in FIG. 13, the feature height-based colored image generating apparatus according to Embodiment 2 includes the following components in a second computer main body unit 400.

As illustrated in FIG. 13, the feature height-based colored image generating apparatus includes a laser data storing unit 203, a second DSM generating unit 225 (for example, 1 m DEM), a second DSM data storing unit 224, a second differencing unit 227, a second differencing data storing unit 229, a second DEM generating unit 233, a 1 m DEM storing unit 235 storing a 1 m DEM, a second DHM generating unit 237, a second inclination image generating unit 241, a second inclination image storing unit 243, a second red relief image generating unit 245 (height emphasized 0.2 times), a second gradient-tinted image generating unit 247, a second feature height-based colored image generating unit 251, a second building height comparison image generating unit 250, and the like.

The feature height-based colored image generating apparatus further includes a second inclination image storing unit 243, a second red relief image storing unit 248, a second gradient-tinted image storing unit 249, a second feature height-based color display image storing unit 252, a second display processing unit 255, and the like.

Also, the laser data storing unit 203 has stored therein laser data Ri obtained by scanning an aboveground city area by means of a laser scanner 14 installed on the aircraft 10 or the like. The laser data Ri is associated with a number of the laser scanner 14, a laser scanner kind, resolution, capturing time, a posture Op at the time of capturing, an altitude, and the like.

The aforementioned aircraft 10 preferably flies in a city area several to several tens of times to acquire laser data Ri (for example, resolution: 1 m).

The second DSM generating unit 225 analyzes the resolution of the laser data Ri and generates a 1 m DSM in the second DSM data storing unit 224.

The second DEM generating unit (for example, 1 m) analyzes the resolution of the laser data Ri, and in a case in which the resolution is 1 m, the second DEM generating unit generates a 1 m DEM and stores the 1 m DEM in the 1 m DEM storing unit 235.

The second differencing unit 227 stores a difference between the 1 m DSM in the second DSM data storing unit 224 and the 1 m DEM in the 1 m DEM storing unit 235 as differencing image data (DHM=DSM-DEM) in the second differencing data storing unit 229.

The second DHM generating unit 237 generates a DHM based on the differencing image data in the second differencing data storing unit 229 and stores the DHM in a second DHM data storing unit 239.

The second red relief image generating unit 245 (for example, height emphasized 0.2 times) reads a height per mesh of the 1 m DSM in the second DSM data storing unit 224. The second red relief image generating unit 245 then generates data obtained by emphasizing the height 0.2 times, for example, in the second red relief image storing unit 248. At this time, the second red relief image generating unit 245 performs reddening processing (hereinbelow referred to as a second red relief image GQ' (emphasized 0.2 times)).

The second inclination image generating unit 241 derives an inclination per mesh of the 1 m DSM in the second DSM data storing unit 224 and generates a second inclination image GS' based on the inclination in the second inclination image storing unit 243.

The second gradient-tinted image generating unit 247 uses the DHM in the second DHM data storing unit 239 to generate a second gradient-tinted image GD' in the second gradient-tinted image storing unit 249.

The second feature height-based colored image generating unit 251 overlays a second building height comparison image GM' in the second building height comparison image storing unit 253 on the second red relief image GQ' (emphasized 0.2 times) in the second red relief image storing unit 248 to generate a second feature height-based colored image GH' in the second feature height-based color display image storing unit 252.

The second display processing unit 255 displays on a second display unit 500 the DHM in the second DHM data storing unit 239, the second inclination image GS' in the second inclination image storing unit 243, the second red relief image GQ' (emphasized 0.2 times) in the second red relief image storing unit 248, or the second gradient-tinted image GD' in the first gradient-tinted image storing unit 149.

Processing of the feature height-based colored image generating apparatus according to Embodiment 2 configured as above will be described below with use of the flowchart in FIG. 14.

Figure 14:
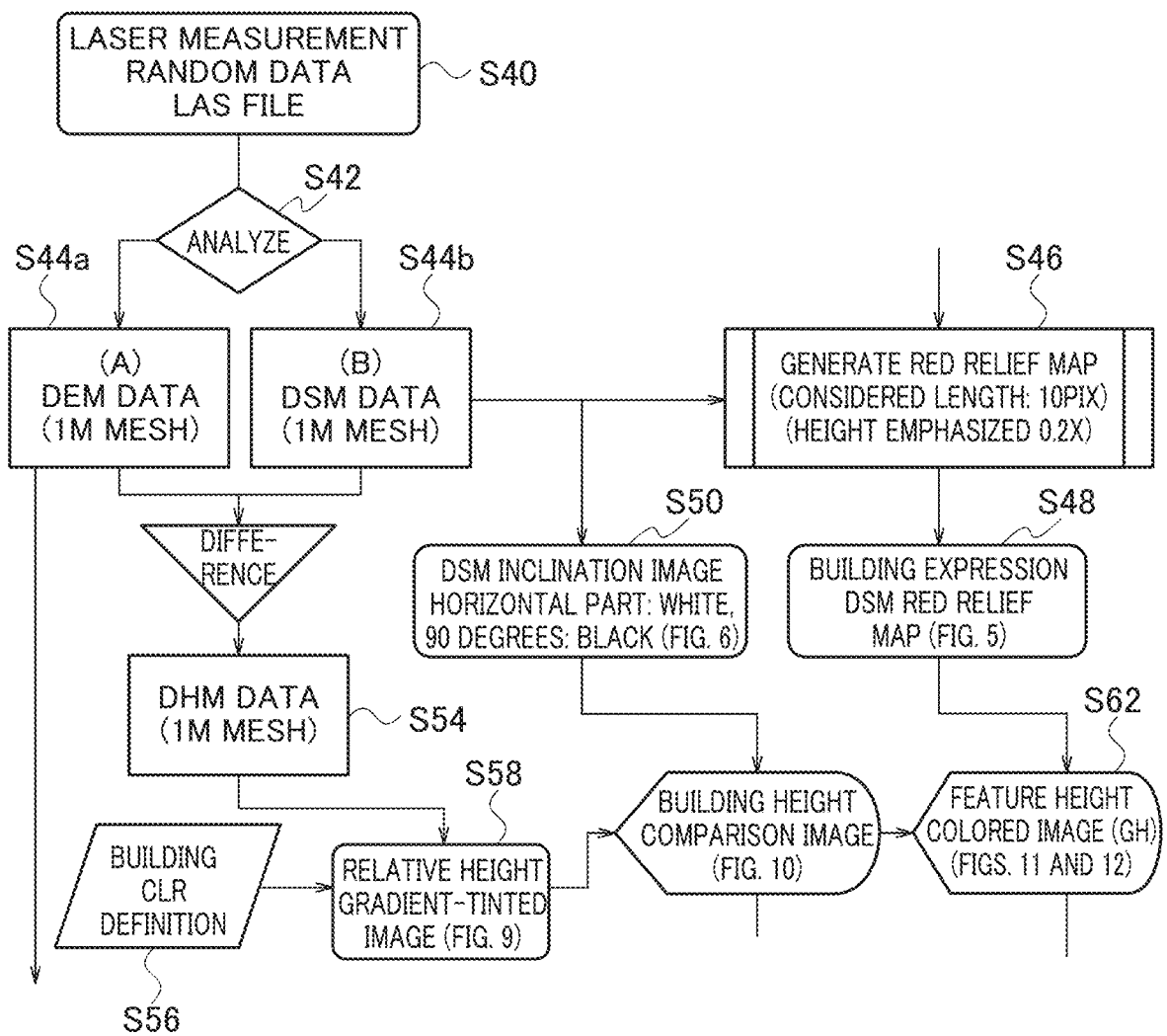
FIG. 14 is a flowchart illustrating processing of the feature height-based colored image generating apparatus according to Embodiment 2.

As illustrated in FIG. 14, laser data Ri in the laser data storing unit 203 is read (S40).

Subsequently, the second DSM generating unit 225 and the second DEM generating unit (for example, 1 m) analyze the resolution of the laser data Ri (S42).

The second DEM generating unit (for example, 1 m) generates a 1 m DEM from a block of the laser data Ri and stores the 1 m DEM in the 1 m DEM storing unit 235 (S44a).

Also, the second DSM generating unit 225 generates a 1 m DSM from the block of the laser data Ri and stores the 1 m DSM in the second DSM data storing unit 224 (S44b).

On the other hand, the second red relief image generating unit 245 (for example, height emphasized 0.2 times) reads a height per mesh of the 1 m DSM in the second DSM data storing unit 224. The second red relief image generating unit 245 then generates a second red relief image GQ' (emphasized 0.2 times) obtained by emphasizing the height 0.2 times, for example, in the second red relief image storing unit 248 (S48).

Consequently, the high building BL illustrated in FIG. 4 (a) looks lower in height as illustrated in FIG. 4 (b), and the shadow SD looks narrower. Also, since the red relief image generating processing is performed, the edge of the building is slightly emphasized.

In generating the second red relief image GQ' (emphasized 0.2 times), a length L of a local region is set to be as long as 10 pixels (about 1 m). The length L changes depending on the height of the building. The second red relief image GQ' (also referred to as a DSM red relief map) is illustrated in FIG. 5. As illustrated in FIG. 5, the entire image is reddish, the edge of each building is emphasized, and the higher building is displayed to be more whitish.

The second inclination image generating unit 241 derives an inclination per mesh of the 1 m DSM in the second DSM data storing unit 224 and generates a second inclination image GS based on the inclination in the second inclination image storing unit 243 (S50: refer to FIG. 6).

On the other hand, the second differencing unit 227 derives a difference between the 1 m DSM in the second DSM data storing unit 224 and the 1 m DSM in the second DSM data storing unit 224 as differencing image data (DHM=DSM-DEM) (S52). The result is stored in the second differencing data storing unit 229.

The second DHM generating unit 237 generates a 1 m mesh DHM based on the second differencing image data in the second differencing data storing unit 229 in the second DHM data storing unit 239 (S54).

The second gradient-tinted image generating unit 247 inputs CRT definition (color value in accordance with the height: refer to FIG. 8) (S56) and generates in the second gradient-tinted image storing unit 249 a second gradient-tinted image GD' (also referred to as a relative height gradient-tinted image) of the DHM (1 m mesh) in the second DHM data storing unit 239 (S58).

That is, as illustrated in FIG. 9, in the second gradient-tinted image GD', the highest building is displayed in purple, the building lower than the purple building is displayed in reddish purple, the building lower than the reddish purple building is displayed in vermillion, and the building lower than the vermillion building is displayed in yellow. Hence, the second gradient-tinted image GD' can be used as a height comparison view.

The second building height comparison image generating unit 250 overlays the second inclination image GS' (refer to FIG. 6) in the second inclination image storing unit 243 on the second gradient-tinted image GD' (refer to FIG. 9) in the second gradient-tinted image storing unit 249 to generate a second building height comparison image GM' illustrated in FIG. 10 in the second building height comparison image storing unit 253 (S60).

Subsequently, the second feature height-based colored image generating unit 251 overlays the building height comparison image GM' (refer to FIG. 10) in the second building height comparison image storing unit 253 on the second red relief image GQ' (emphasized 0.2 times) (refer to FIG. 5) in the second red relief image storing unit 248 to generate a second feature height-based colored image GH' in the second feature height-based color display image storing unit 252 (S62).

Figure 15:
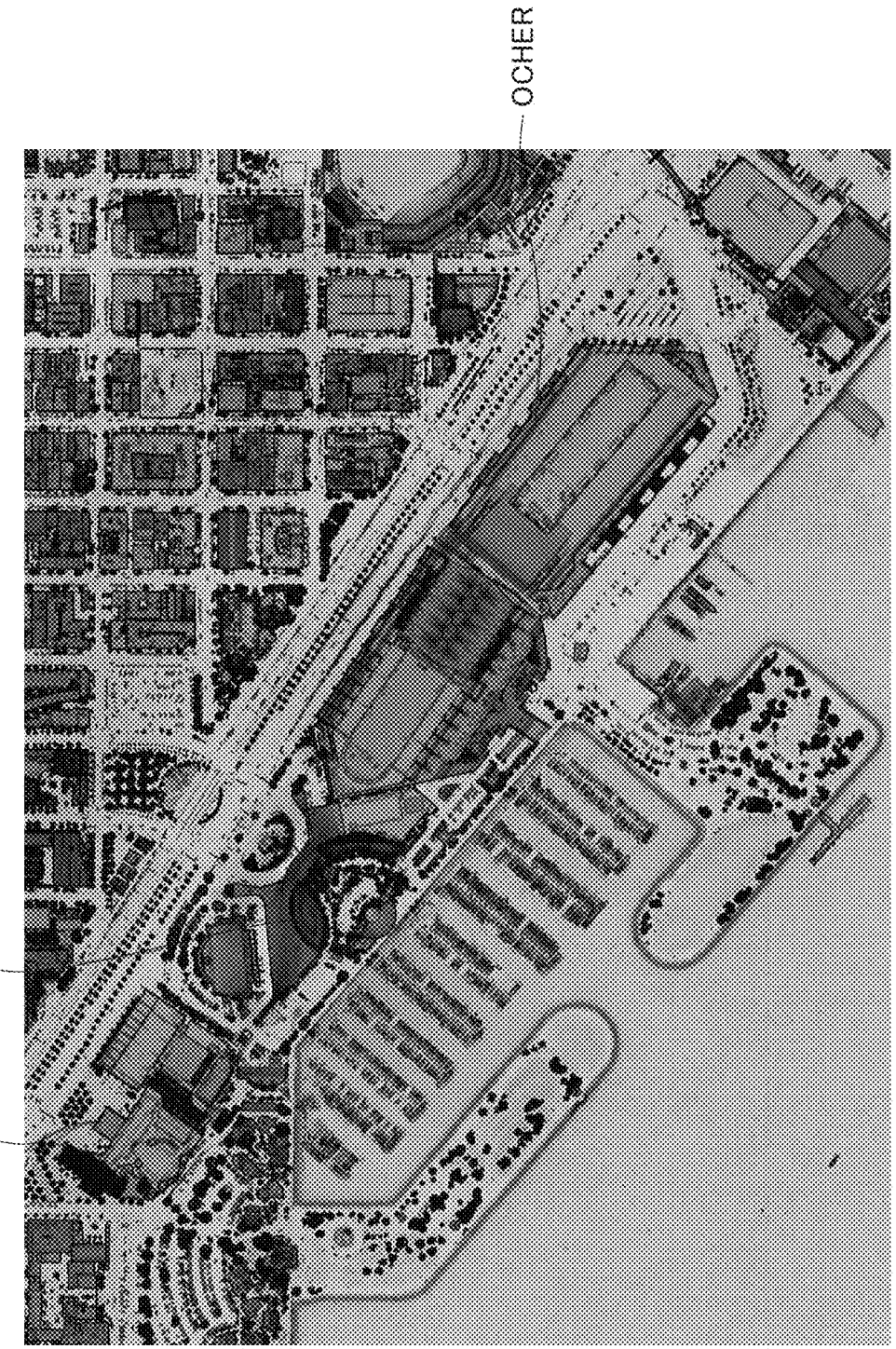
FIG. 15 illustrates a feature height-based colored image GH'.

The second feature height-based colored image GH' is illustrated in FIG. 15. As illustrated in FIG. 15, in the second feature height-based colored image GH' (also referred to as Cool Map), the features such as the buildings and the trees are displayed clearly due to the use of the laser data Ri (the reason for this is that, unlike the case of the oblique camera, the laser reaches the terrains and the features substantially vertically).

(Red Relief Map Generating Processing)

Red relief map generating processing will be described below. First, the DEM will be described.

The 5 m mesh ground DEM (Geospatial Information Authority of Japan) in the ground DEM storing unit 131 is referred to as digital elevation model data.

The ground DEM (Geospatial Information Authority of Japan) has a grid structure with a desired grid distance d (for example, 0.2 m, 0.5 m, 1 m, or 5 m) in the entire measurement area. In the present embodiment, the 5 m mesh ground DEM (Geospatial Information Authority of Japan) is used.

The first DEM generating unit 133 (for example, 2 m mesh) or the second DEM generating unit 233 (for example, 1 m mesh) performs filtering, in which, in airborne laser measurement data, the buildings, the trees, and the like except the terrain surface are eliminated from elevation data measured mainly by a pulse (last pulse) returned last among laser reflection pulses, and stores grid-like elevation data of the ground (hereinbelow referred to as DEM data) obtained by an elevation value interpolation method in the first DEM storing unit 135 (for example, 2 m mesh) or the second DEM storing unit 235 (for example, 1 m mesh). The first DEM storing unit 135 (for example, 2 m mesh) and the second DEM storing unit 235 are collectively referred to as a DEM data storing unit 23.

Specifically, as illustrated in FIG. 16, X coordinates (longitudes Xi), Y coordinates (latitudes Yi), and Z coordinates (ground elevation values Zgi) at center points of respective grids each provided with grid number i (i=1, 2, . . . , n) correspond to one another.

An example of the aforementioned elevation value interpolation method is a method of generating a contour map in which airborne laser measurement data pieces having equal elevation values are connected, generating a triangulated irregular network (TIN) for the contour map to restore a ground, and deriving heights of crossing points between the TIN and respective grid points.

The first red relief image generating unit 145 and the second red relief image generating unit 245 are collectively referred to as a red relief image generating unit.

Figure 17:
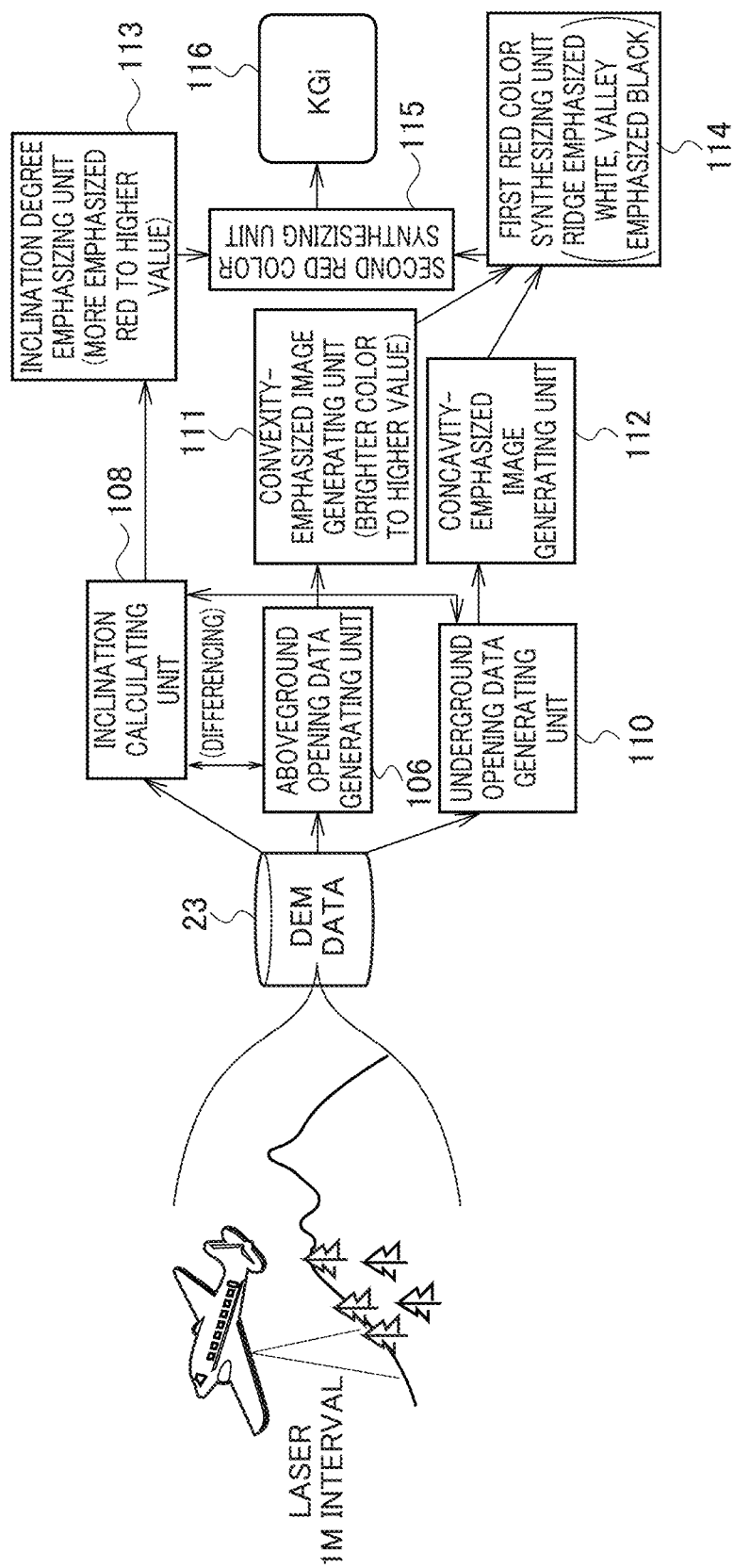
FIG. 17 is a schematic configuration diagram of a red relief image generating unit.

The red relief image generating unit is configured as illustrated in FIG. 17.

As illustrated in FIG. 17, the red relief image generating unit includes an aboveground opening data generating unit 106, an underground opening data generating unit 110, an inclination calculating unit 108, a convexity-emphasized image generating unit 111, a concavity-emphasized image generating unit 112, an inclination degree emphasizing unit 113, a first red color synthesizing unit 114, and a second red color synthesizing unit 115.

Figure 18:
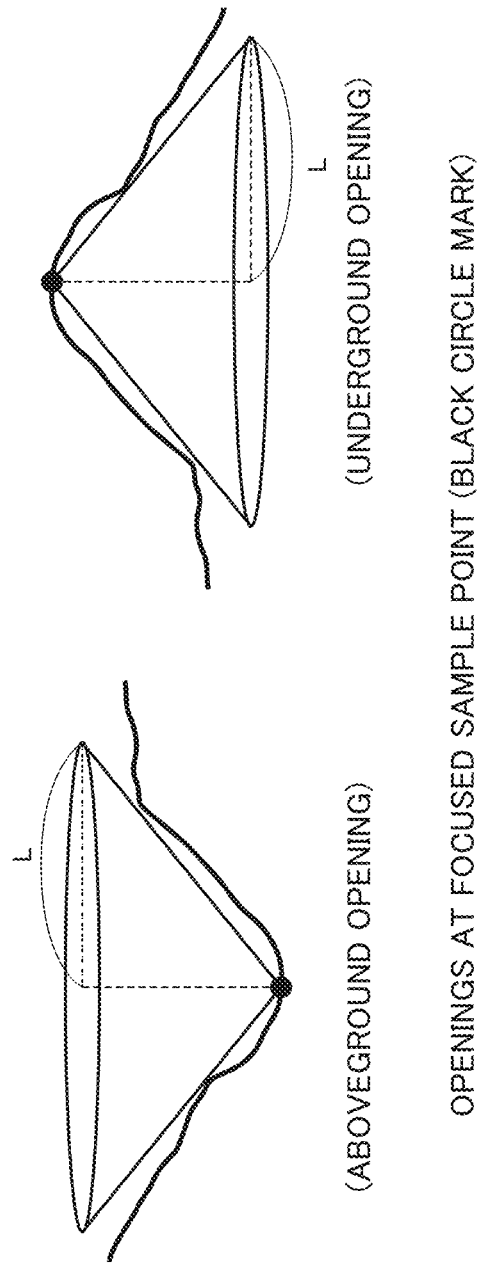
FIG. 18 illustrates principles of an aboveground opening and an underground opening.

In the present embodiment, the concept of an opening is used. First, the opening will be described. The opening is a quantified degree by which a spot in concern is convex aboveground or concave underground in comparison with surroundings. In other words, as illustrated in FIG. 18, an aboveground opening represents an extent of the sky to be seen within a range of a length L from a focused sample point, and an underground opening represents an extent under the ground, within a range of the length L, when taking a survey in the soil in a handstand position.

The openings depend on the length L and a surrounding terrain. FIG. 19 illustrates, for nine kinds of principal terrains, their aboveground openings and underground openings by octagonal graphs representing aboveground angles and underground angles in respective directions. Generally, the aboveground opening increases as the spot is projected higher from the surrounding, and has a value to be high at a crest or ridge, but low in a howe or at a valley bottom.

To the contrary, the underground opening increases as the spot is cut underground lower, and has a value to be high in a howe or at a valley bottom, but low at a crest or ridge. Actually, since a variety of principal terrains are weaved even in the range of the length L, the octagonal graphs of the aboveground angles and the underground angles are frequently deformed, giving a variety of opening values.

As described above, $D\varphi L$ and $D\psi L$ have non-increasing characteristics to L, and $\Phi L$ and $\Psi L$ have non-increasing characteristics to L, accordingly.

Further, the opening diagram permits extraction of information to fit to the terrain scale, by specification of a calculated length, allowing for an indication free from dependency on directional and local noises.

Figure 20:
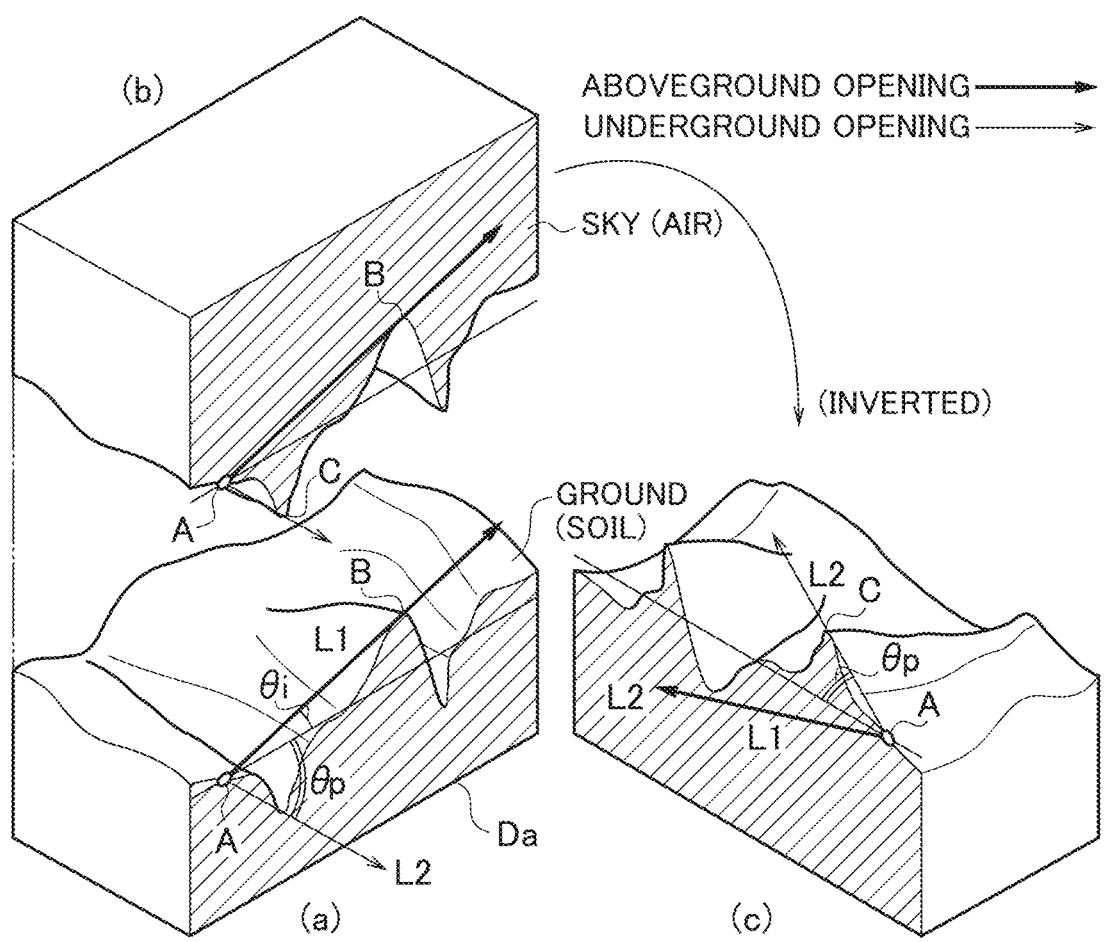
FIG. 20 stereoscopically illustrates the aboveground opening and the underground opening.

That is, excellent extraction of a ridge line and a valley line allows abundant geographical and geological information to be read. As illustrated in FIG. 18, on DEM data (ground surface: solid: FIG. 20 (a)) within a fixed range, derived is an angular vector of a horizontal line to a straight line L1 connecting a set sample point A with a sample point B, which is a highest peak when viewed in any one of eight directions from the sample point A.

In this way, angular vectors are derived over the eight directions, and an average of the angular vectors is referred to as an aboveground opening Oi (elevation degree). On invert DEM data (FIG. 20 (c)), which is a reverse of a solid (FIG. 20 (b)) having an air layer pushed on the DEM data within the fixed range (ground surface: solid), derived is an angle $\theta p$ of a horizontal line to a straight line L2 connecting the sample spot A with a sample point C (corresponding to a deepest place), which is a highest peak when viewed in any one of eight directions from the sample point A. In this way, angles are derived over the eight directions, and an average of the angles is referred to as an underground opening (depression degree).

That is, the aboveground opening data generating unit 106 generates, on DEM data included within a range of a fixed length from a focused point, a terrain section in each of eight directions, and derives a maximum value (when viewed in a vertical direction) among inclinations of lines (L1 in FIG. 20 (a)) connecting the focused point with respective terrain points.

Such processing is performed in the eight directions. The angle of the inclination is an angle from the zenith (90 degrees on a flat, above 90 degrees at a ridge or crest, or below 90 degrees at a valley bottom or in a howe).

Also, the underground opening data generating unit 110 generates, within a range of the fixed length from the focused point on invert DEM data, a terrain section in each of eight directions, and derives a maximum value (a minimum value when L2 is viewed in the vertical direction in the three-dimensional figure of the ground surface in FIG. 20 (a)) among inclinations of lines connecting the focused point with respective terrain points. Such processing is performed in the eight directions.

When L2 is viewed in the vertical direction in the three-dimensional figure of the ground surface in FIG. 20 (a), the angle is 90 degrees on a flat, below 90 degrees at a ridge or crest, or above 90 degrees at a valley bottom or in a howe.

In other words, for the aboveground opening and underground opening, as illustrated in FIG. 21, two sample points A (iA, jA, HA) and B (iB, jB, HB) are supposed. Since the sample spacing is 1 m, the length between A and B is given as follows.

$$P=\{(iA-iB)2+(jA-jB)2\}^{1/2} \quad (1)$$

FIG. 21 (a) illustrates a relationship between the sample points A and B, relative to an elevation 0 m as a reference. An elevation angle θ of the sample point B to the sample point A is given as follows.

$$\theta = \tan-1\{(HB-HA)/P\}$$

The sign of θ is positive for (1) HA<HB, or negative for (2) HA>HB.

A set of sample points residing in a direction D within a range of a length L from a focused sample point is denoted by DSL and is referred to as "a D-L set of a focused sample point". In a case of DβL: a maximum value among elevation angles of respective elements of DSL to a focused sample point, and DδL: a minimum value among elevation angles of respective elements of DSL to a focused sample point (refer to FIG. 21 (b)), the following definitions are given.

Definition 1: An aboveground angle and an underground angle of a D-L set of a focused sample point shall mean the following, respectively:

$$D\varphi L = 90 - D\beta L, \text{ and}$$

$$D\Psi L = 90 + D\delta L.$$

DφL means a maximum value of a zenith angle in which the sky in a direction D can be seen within a length L from a focused sample point. A generally called horizon angle corresponds to the aboveground angle in a case in which L is an infinity. Also, DψL means a maximum value of a nadir angle in which the soil in a direction D can be seen within a length L from a focused sample point.

As L is increased, the number of sample points belonging to DSL increases. Hence, L has a non-decreasing characteristic to DφL, and on the contrary, DδL has a non-increasing characteristic.

Therefore, DφL and Dψ1 have non-increasing characteristics to L.

In the geodesy, a high angle is a concept defined with reference to a horizontal plane passing a focused sample point, and strictly, the high angle is not coincident with θ. Also, for a strict discussion of an aboveground angle and an underground angle, the curvature of the earth should also be considered, and Definition 1 is not always an exact description. Definition 1 is a concept defined on the assumption that a geomorphic analysis is made by using DEM.

The aboveground angle and the underground angle have been concepts for a specified direction D, and these angles will be expanded by introducing the following definition.

Definition II: An aboveground opening and an underground opening of a length L from a focused sample point shall mean the following, respectively:

$$\Phi L=(0\varphi L+45\varphi L+90\varphi L+135\varphi L+180\varphi L+225\varphi L+270\varphi L+315\varphi L)/8, \text{ and}$$

$$\Psi L=(0\psi L+45\psi L+90\psi L+135\psi L+180\psi L+225\psi L+270\psi L+315\psi L)/8.$$

The aboveground opening represents an extent of the sky to be seen within a range of the length L from the focused sample point, and the underground opening represents an extent under the ground, within a range of the length L, when taking a survey in the soil in a handstand position (refer to FIG. 16).

(Description of Respective Components)

The inclination calculating unit 108 meshes DEM data in the memory 24 into squares and derives an average gradient of a surface of a square neighboring a focused point on a mesh. There are four neighboring squares, and any one of them is chosen as a focused square. Altitudes at four corners of the focused square and an average inclination of the focused square are then derived. The average inclination is an inclination of a surface approximated from four points by using the method of least squares.

The convexity-emphasized image generating unit 111 has a first grayscale for indicating a ridge and a valley bottom by brightness. Each time the aboveground opening data generating unit 119 derives an aboveground opening (an average angle when a range of L is seen in eight directions from a focused point: an index for determination of whether the residing place is high), the convexity-emphasized image generating unit 111 calculates a brightness (luminance) corresponding to the aboveground opening Oi.

For example, in a case in which the values of the aboveground opening fall within a range of about 40 degrees to 120 degrees, the first grayscale is associated with a range of 50 degrees to 110 degrees and is allotted to 255 tones. That is, a part closer to a ridge part (convexity) has a higher value of the aboveground opening and is whiter in color.

Subsequently, the convexity-emphasized image generating unit 111 reads an aboveground opening image Dp and allots, to a mesh region having a focused point (coordinate) (in a case in which contour lines connecting equal Z values of DEM data are meshed (for example, 1 m) into squares and in which a focused point is set to a point at any of four corners of the mesh), color data based on the first gray scale and stores the aboveground opening image Dp in a memory.

Subsequently, a tone correcting unit (not illustrated) of the convexity-emphasized image generating unit 111 inverts color tones of the aboveground opening image Dp and stores the inverted aboveground opening image Dp. That is, the aboveground opening image Dp adjusted for the ridge to be indicated white is obtained.

The concavity-emphasized image generating unit 112 has a second grayscale for indicating a valley bottom and a ridge by brightness. Each time the underground opening data generating unit 110 derives an underground opening (an average of angles in eight directions from a focused point), the concavity-emphasized image generating unit 112 calculates a brightness corresponding to the underground opening.

For example, in a case in which the values of the underground opening fall within a range of about 40 degrees to 120 degrees, the second grayscale is associated with a range of 50 degrees to 110 degrees and is allotted to 255 tones.

That is, a part closer to a valley bottom part (concavity) has a higher value of the underground opening and is blacker in color.

Subsequently, the concavity-emphasized image generating unit 112 reads an underground opening image Dq and allots, to a mesh region having a focused point (coordinate) (in a case in which contour lines connecting equal Z values of DEM data are meshed (for example, 1 m) into squares and in which a focused point is set to a point at any of four corners of the mesh), color data based on the second gray scale and stores the underground opening image Dq. Subsequently, color tones of the underground opening image Dp are corrected.

In a case in which the color is toned excessively black, the color is set to a tone of color according to a corrected tone curve. This is called the underground opening image Dq and is stored (in a memory).

The inclination degree emphasizing unit 113 has a third grayscale for indicating the degree of inclination by brightness. Each time the inclination calculating unit 8 derives an inclination degree (an average of values in eight directions from a focused point), the inclination degree emphasizing unit 113 calculates a brightness (luminance) corresponding to the inclination degree.

For example, in a case in which the values of an inclination ai fall within a range of about 0 degrees to 70 degrees, the third grayscale is associated with a range of 0 degrees to 50 degrees and is allotted to 255 tones. That is, the value of 0 degrees is allotted to white, and the values of 50 degrees or more are allotted to black. A spot having a higher inclination ai is blacker in color.

Subsequently, the inclination degree emphasizing unit 113 stores a difference image between the underground opening image Dq and the aboveground opening image Dp as an inclination image Dra.

At this time, the inclination degree emphasizing unit 113 allots, to a mesh region having a focused point (coordinate) (in a case in which contour lines connecting equal Z values of DEM data are meshed (for example, 1 m) into squares and in which a focused point is set to a point at any of four corners of the mesh), color data based on the third gray scale. Subsequently, R is emphasized by means of an RGB color mode function in the reddening processing. That is, an inclination-emphasized image Dr, in which a more inclined part has a more emphasized red, is obtained.

The first red color synthesizing unit 114 multiplies the aboveground opening image Dp by the underground opening image Dq to obtain a synthesized synthetic image Dh (Dh=Dp+D1). At this time, a balance of both the images is adjusted to avoid collapsing the valley part.

The aforementioned "multiplication" is a term in a layer mode on a photoshop (registered trademark) and corresponds to an OR operation for numeric processing.

TABLE 1

| Brightness | Grayscale | i − 1 | i | i + 1 |
|---|---|---|---|---|
| Lighter as higher | Aboveground | 36 | 52 | 45 |
| Darker as higher | Underground | 32 | 48 | 61 |
| | Total | 68 | 100 | 106 |

In the balance adjustment, for allocation of values to the aboveground opening and the underground opening at a spot, the ground surface is cut out by a fixed radius (L/2) about the spot.

The extent of the sky looked up from the ground surface in a case in which the entire sky is uniform in brightness gives a brightness of the ground surface.

That is, the aboveground opening represents the brightness. However, when light streaming around is assumed, a value of the underground opening should be considered.

Depending on how the ratio of both the values is set, an arbitrary modification such as an emphasis at a ridge part of a terrain can be achieved. When a terrain in a valley is to be emphasized, the value of b may be increased.

Index of brightness=$a \times$aboveground opening$-b \times$ underground opening where a+b=1.

Figure 22:
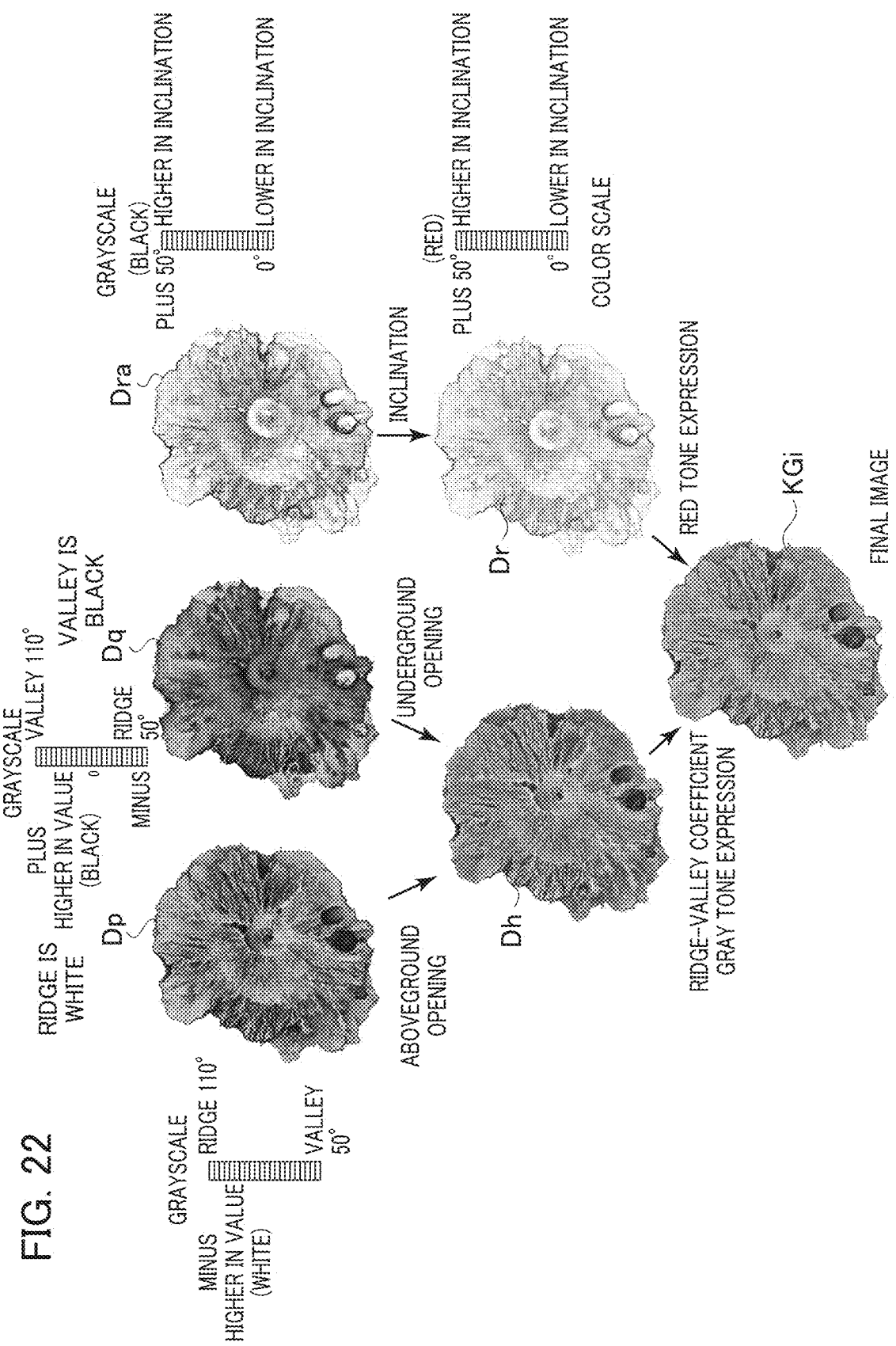
FIG. 22 illustrates a process of generating an inclination red relief image.

That is, as illustrated in FIG. 22, the aboveground opening image Dp (with the ridge emphasized white) and the underground opening image Dq (with the bottom emphasized black) are multiplication-synthesized to obtain a synthetic image with a gray tone indication (Dh=Dp+D1).

On the other hand, the second red color synthesizing unit 115 synthesizes the inclination-emphasized image Dr in the file with the synthetic image Dh obtained by a synthesis in the first red color synthesizing unit 114 to obtain a red relief image KGi with the ridge emphasized with red color and stores the red relief image KGi in a memory 26.

That is, as illustrated in FIG. 22, obtained are the synthetic image Dh with a gray tone indication obtained by a multiplication-synthesis of the aboveground opening image Dp (with the ridge emphasized white) and the underground opening image Dq (with the bottom emphasized black) and the inclination-emphasized image Dr obtained by emphasizing red as the inclination is greater on the inclination image Dra.

The inclination-emphasized image Dr and the synthetic image Dh are synthesized, which causes the red relief image KGi with the ridge emphasized red to be obtained.

That is, as illustrated in FIG. 23, the red relief image KGi includes a grid number of a mesh, X, Y, and Z coordinates, an aboveground opening, a color value thereof, an elevation-depression degree, a color value thereof, an inclination degree, a color value thereof, an underground opening, a color value thereof, and the like.

Meanwhile, although the above embodiments have been described with use of the red relief image, a red relief image provided with Lab colors may be used (Japanese unexamined patent publication No. 2011-048495).

The red relief image provided with Lab colors is generated with use of an Lab color model. For example, a channel a* is allocated to the aboveground opening image Dp, a channel b* is allocated to the underground opening image Dq, and a channel L* is allocated to the inclination-emphasized image Dr, to obtain an Lab image of the aboveground opening image Dp, the underground opening image Dq, and the inclination-emphasized image Dr.

The Lab image is then synthesized with a synthetic image (Ki) obtained by overlaying the aboveground opening image Dp, the underground opening image Dq, and the inclination-emphasized image Dr on each other. The red relief image provided with Lab colors further exerts a stereoscopic effect with no feeling of strangeness and enables riverine systems to be traced easily.

Also, in a case of a seafloor map, a stereoscopic map provided with blue, purple, and green, except red, may be used.

In the foregoing embodiments, a configuration and a processing procedure of an apparatus for embodying the technical idea of the present invention are illustrated, and the illustration shall not limit arrangement and combination of components, an order of the processing, and the like.

The technical idea of the present invention can be altered in various ways within the technical scope described in the patent claims. It is to be noted that the drawings are schematic, and that a configuration or the like of an apparatus differs from an actual one.

INDUSTRIAL APPLICABILITY

The present invention can be applied to a feature height-based colored image generating apparatus in which a height of a feature in a city area is displayed in color in accordance with the height, and in which an image does not look dirty.

REFERENCE SIGNS LIST 102 oblique camera image storing unit
107 3D city model generating unit
121 first point cloud LAS filing unit
125 first DSM generating unit
127 first differencing unit
131 ground DEM storing unit
133 first DEM generating unit
137 first DHM generating unit 137
141 first inclination image generating unit
145 first red relief image generating unit
150 first building height comparison image generating unit
151 first feature height-based colored image generating unit
203 laser data storing unit
221 second point cloud LAS filing unit
233 second DEM generating unit
225 second DSM generating unit
227 second differencing unit
237 second DHM generating unit
241 second inclination image generating unit
245 second red relief image generating unit
247 second gradient-tinted image generating unit
250 second building height comparison image generating unit
251 second feature height-based colored image generating unit

The invention claimed is:

1. A feature height-based colored image generating apparatus, comprising:
    a computer configured to execute operations including:
    storing, in a memory, a digital elevation model (DEM) of an area;
    storing, in the memory, a digital surface model (DSM) of the area;
    generating a DHM, which is a difference between the digital elevation model (DEM) and the digital surface model (DSM), in the memory;
    deriving an inclination per mesh of the DHM and generating an inclination image in which a grayscale value corresponding to the inclination is allocated to the mesh;
    decreasing an elevation value allocated to each mesh of the digital surface model (DSM) certain times per mesh, setting each mesh as a focused point, defining a certain range per focused point, and deriving an aboveground opening, an underground opening, and an inclination, to generate in the memory a red relief image in which a brighter color is allocated to a part having a higher aboveground opening, in which a darker color is allocated to a part having a higher underground opening, and in which a red-emphasized color is allocated to a part having a higher inclination;
    reading per mesh of the DHM a height of a feature allocated to the mesh and generating in the memory a relative height gradient-tinted image in which a color value is allocated to the mesh in accordance with the height of the feature;
    generating in the memory a feature height comparison image in which the inclination image and the relative height gradient-tinted image are overlaid on each other; and
    generating in the memory a feature height-based colored image in which the red relief image and the feature height comparison image are overlaid on each other.

2. The feature height-based colored image generating apparatus according to claim 1, wherein decreasing the elevation value allocated to each mesh of the digital surface model the certain times is decreasing the elevation value 0.2 times.

3. The feature height-based colored image generating apparatus according to claim 1, wherein the area is a city, and wherein the operations further include:
    meshing file data of a three-dimensional city model based on camera image data captured by an image capturing camera that captures images of the feature in the city in a plurality of different directions by aircraft to generate the digital surface model (DSM) in the memory;
    storing, in the memory, a first ground DEM of the area; and
    reading the first ground DEM and generating in the memory a second ground DEM obtained by meshing the first ground DEM.

4. The feature height-based colored image generating apparatus according to claim 3, wherein the operations further include:
    storing, in the memory, laser data obtained by laser-scanning the area by aircraft,
    wherein a digital surface model (DSM) is generated in the memory based on the laser data,
    wherein a digital elevation model (DEM) is generated in the memory based on the laser data, and
    wherein the DHM is generated in the memory with use of the digital surface model (DSM) and the digital elevation model (DEM) based on the laser data.

5. A non-transitory recording medium storing a feature height-based colored image generating program causing a computer to execute operations including:
    storing, in a memory, a digital elevation model (DEM) of an area;
    storing, in the memory, a digital surface model (DSM) of the area;
    generating a DHM, which is a difference between the digital elevation model (DEM) and the digital surface model (DSM), in the memory;
    deriving an inclination per mesh of the DHM and generating an inclination image in which a grayscale value corresponding to the inclination is allocated to the mesh;
    decreasing an elevation value allocated to each mesh of the digital surface model (DSM) certain times per mesh, setting each mesh as a focused point, defining a certain range per focused point, and deriving an aboveground opening, an underground opening, and an inclination, to generate in the memory a red relief image in which a brighter color is allocated to a part having a higher aboveground opening, in which a darker color is allocated to a part having a higher underground opening, and in which a red-emphasized color is allocated to a part having a higher inclination;

reading per mesh of the DHM a height of a feature allocated to the mesh and generating in the memory a relative height gradient-tinted image in which a color value is allocated to the mesh in accordance with the height of the feature;

generating in the memory a feature height comparison image in which the inclination image and the relative height gradient-tinted image are overlaid on each other; and generating in the memory a feature height-based colored image in which the red relief image and the feature height comparison image are overlaid on each other.

6. The non-transitory recording medium storing the feature height-based colored image generating program according to claim 5, wherein decreasing the elevation value allocated to each mesh of the digital surface model the certain times is decreasing the elevation value 0.2 times.

7. The non-transitory recording medium storing the feature height-based colored image generating program according to claim 5, wherein the area is a city, and wherein the operations further include:

meshing file data of a three-dimensional city model based on camera image data captured by an image capturing camera that captures images of the feature in the city in a plurality of different directions by aircraft to generate the digital surface model (DSM) in the memory;

storing, in the memory, a first ground DEM of the area; and reading the first ground DEM and generating in the memory a second ground DEM obtained by meshing the first ground DEM.

8. The non-transitory recording medium storing the feature height-based colored image generating program according to claim 5, wherein the operations further include:

storing, in the memory, laser data obtained by laser-scanning the area by aircraft, generating a digital surface model (DSM) in the memory based on the laser data, generating a digital elevation model (DEM) in the memory based on the laser data, and generating the DHM in the memory with use of the digital surface model (DSM) and the digital elevation model (DEM) based on the laser data.

* * * * *